US006535480B1

United States Patent
Bhagavath et al.

(10) Patent No.: US 6,535,480 B1
(45) Date of Patent: Mar. 18, 2003

(54) SYSTEM AND METHOD TO PROVIDE SURVIVABILITY FOR BROADCAST VIDEO AND INTERACTIVE IP-BASED SERVICES ON CABLE ACCESS NETWORKS

(75) Inventors: Vijay K. Bhagavath, Lincroft, NJ (US); Joseph Thomas O'Neil, Staten Island, NY (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/197,170

(22) Filed: Nov. 20, 1998

(51) Int. Cl.[7] .............................................. H04J 15/00
(52) U.S. Cl. ........................ 370/225; 370/490; 455/426
(58) Field of Search ................................. 370/216–228,
370/209, 242, 245, 252, 253, 463, 490,
485–489; 455/423, 426, 428, 429

(56) References Cited

U.S. PATENT DOCUMENTS

| | | | |
|---|---|---|---|
| 3,943,447 A | 3/1976 | Shomo | 325/308 |
| 4,528,663 A | 7/1985 | Citta | 370/94 |
| 4,533,948 A | 8/1985 | McNamara et al. | 358/122 |
| 4,553,161 A | 11/1985 | Citta | 358/86 |
| 4,633,462 A | 12/1986 | Stifle et al. | 370/85 |
| 4,677,467 A | 6/1987 | Hayes | 358/86 |
| 4,920,533 A | 4/1990 | Dufresne et al. | 370/85.2 |
| 5,329,308 A | 7/1994 | Binns et al. | 348/14 |
| 5,557,319 A | 9/1996 | Gurusami et al. | 348/11 |
| 5,751,789 A * | 5/1998 | Farris et al. | 455/426 |
| 5,790,806 A | 8/1998 | Koperda | 395/200.82 |
| 6,282,423 B1 * | 8/2001 | Scott, II | 455/439 |
| 6,320,843 B1 * | 11/2001 | Rydbeck et al. | 370/209 |

* cited by examiner

Primary Examiner—Salvatore Cangialosi

(57) ABSTRACT

A hybrid fiber/coaxial cable is attached to an autonomous controller which includes a wireless receiver, transmitter, and antenna. Typically, the autonomous controller is connected near the end of the cable which is remote from the headend. At least one other hybrid fiber/coaxial cable connected to the same headend or distribution hub, provides connectivity for cable data modems and set top boxes in an adjacent neighborhood or community. The second cable is attached to its own, respective autonomous controller which also has a wireless receiver, transmitter, and antenna. The two antennas in the adjacent neighborhoods constitute an antenna cluster. When the first cable's connection to the common headend is interrupted, thereby preventing service to the first neighborhood, its autonomous controller senses the interruption and responds by sending a wireless signal to the controller in the adjacent neighborhood. In response, the two controllers use an antenna cluster protocol (ACP) to set up a wireless communications path through the second cable to the headend. In this manner, service is restored from the headend to the cable data modems and set top boxes in the first neighborhood.

73 Claims, 22 Drawing Sheets

ANTENNA FREQUENCIES

| STATE | RECEIVES | TRANSMITS |
|---|---|---|
| STANDBY | F(UPSTREAM) | NO |
| PROTECTED | F(DOWNSTREAM) | F(UPSTREAM) |
| ACTIVE | F(UPSTREAM) | F(DOWNSTREAM) |

SYSTEM AND METHOD TO PROVIDE SURVIVABILITY FOR BROADCAST VIDEO AND INTERACTIVE IP-BASED SERVICES ON CABLE ACCESS NETWORKS

BACKGROUND OF THE INVENTION

1. Field of the Invention

The invention disclosed is broadly related to telecommunications and is more particularly related to systems and methods to provide survivability for cable access networks.

2. Prior Art

Broadband access networks (e.g. hybrid fiber/coaxial) are used to provide television programming and Internet access for customers. More recently they are being investigated to provide IP telephony service. However, the reliability of hybrid fiber/coaxial (HFC) cable networks is not comparable to the high reliability of the local telephone network. Local telephone networks are designed to meet an unavailability objective of 53 minutes/year/line. HFC cable networks have a downtime of 622 minutes/year/line due to AC power failure and additional 125 minutes/year/line due to failures other than AC power failure (e.g. amplifier failure, water leakage, cable cuts). One key difference between a local loop network and an HFC cable network is that the former uses battery power at the central office. The latter requires commercial AC power in the field for amplifiers and coaxial taps. Loss of AC power causes a failure of the HFC cable delivery network.

What is needed is a cost-effective approach to significantly improve the overall downtime of an HFC cable network from its current (~747/min/yr/line). What is needed is a way to implement physically diverse-path routing (self-healing) for the information-bearing signals (e.g., video, Internet access, IP telephony) to improve the "survivability" of the HFC network. What is needed is a way to improve downtime by providing protection against single point failures of one or more elements constituting the fiber/coax link, including the cables, amplifiers, taps, etc.

SUMMARY OF THE INVENTION

A communications network topology is disclosed that provides survivability for broadcast video and audio and interactive data communications services on cable access networks. A hybrid fiber/coaxial cable connected to a headend or distribution hub, provides connectivity for many cable data modems and set top boxes in a neighborhood or community, in the conventional manner. When a cable's connection to the headend is accidentally interrupted, service can be rapidly restored to the affected cable data modems and set top boxes attached to the cable, by means of the invention disclosed herein.

In accordance with the invention, the hybrid fiber/coaxial cable is attached to an autonomous controller which includes a wireless receiver, transmitter, and antenna. Typically, the autonomous controller is connected near the end of the cable which is remote from the headend. At least one other hybrid fiber/coaxial cable connected to the same headend or distribution hub, provides connectivity for cable data modems and set top boxes in an adjacent neighborhood or community. The second cable is attached to its own, respective autonomous controller which also has a wireless receiver, transmitter, and antenna. The two antennas in the adjacent neighborhoods constitute an antenna cluster. When the first cable's connection to the common headend is interrupted, thereby preventing service to the first neighborhood, its autonomous controller senses the interruption and responds by sending a wireless signal to the controller in the adjacent neighborhood. In response, the two controllers use an antenna cluster protocol (ACP) to set up a wireless communications path through the second cable to the headend. In this manner, service is restored from the headend to the cable data modems and set top boxes in the first neighborhood.

The antenna cluster protocol (ACP) is based on each autonomous controller including a state machine having a standby state, a protected state, and an active state. During the normal operation of the cable, the controller detects signals arriving from the headend via the cable, and the state machine in the controller uses this indication to remain in the standby state. When in the standby state, the wireless receiver in the controller continues operating to receive any signals on an upstream frequency from other antennas in its cluster, but the wireless transmitter is turned off to conserve power.

When the signals from the headend through the first cable fail to be received at the first controller, the first state machine changes to the protected state. In the protected state, the controller's transmitter is turned on and an ACP control packet is transmitted to other antennas in its cluster on the upstream frequency. This ACP control packet identifies the sender as the first controller and it indicates that the first controller is in the protected state. Since any other controllers in the same cluster will be receiving on the same frequency, they are immediately made aware of the outage condition that has occurred on the first cable. Upon changing to the protected state, the wireless receiver in the first controller changes its receiving frequency to a downstream frequency.

Each controller in an antenna cluster is preassigned a distinct time interval value to wait while in the standby state before responding to the receipt of the ACP protected state control packet. The state machine in the controller having the shortest waiting interval changes from the standby to the active state. Thus, in response to having received the ACP protected state control packet, the second controller changes to the active state. In the active state, the second controller's transmitter is turned on and an ACP control packet is transmitted to other antennas in its cluster on the downstream frequency. This ACP control packet identifies the sender as the second controller and it indicates that the second controller is in the active state. Since only controllers that are in the protected state can receive on the downstream frequency, the protected state controllers are immediately made aware that there is a controller available to provide an alternate path to the headend to circumvent the outage condition that has occurred on the first cable.

Once the first and second controllers identify themselves to each other as being in the protected and active states, respectively, the antenna cluster protocol (ACP) enables traffic signals to pass to and from the first controller via its wireless antenna to the wireless antenna of the second controller for transmission through the second cable path to and from the common headend. In this manner, the outage condition that has occurred on the first cable is circumvented.

In antenna clusters consisting of more than two controllers connected through their respective cables to a common headend, the active state controller can exchange the traffic signals with the headend for a plurality of protected state controllers through the active controller's cable path.

To prevent more than one controller at a time from remaining in the active state, each of the controllers has a unique identity and priority for remaining in the active state. If an active state controller determines that there is another active controller having a higher priority, then the lower priority controller reverts to the standby state.

A controller in the protected state periodically broadcasts an ACP protected state control packet until its cable is repaired or it is taken off-line. The active state controller monitors these ACP control signals, and when they no longer are received, the active state controller reverts to the standby state.

A controller in the protected state continues to monitor for the resumption of the signals arriving from the headend via its cable, and its state machine uses this condition of an absence of such signals to remain in the protected state. When the signals from the headend through the cable are once again received at the protected state controller, it changes to the standby state.

An active state controller continues to detect the signals arriving from the headend via its cable, and its state machine uses this indication to remain in the active state. When the signals from the headend through the cable fail to be received at the active state controller, it changes to the protected state. Then another, standby state controller in the same cluster will change its state to the active state. The antenna cluster protocol (ACP) enables traffic signals to and from the old active state (now protected state) controller to pass via their wireless antennas to the new active state controller for transmission through its cable path to and from the common headend.

In one preferred embodiment, the ACP protected state control packet is an ICMP message broadcast via the wireless antenna of the controller in the protected state and the ACP active state control packet is an ICMP message broadcast via the wireless antenna of the controller in the active state.

In one preferred embodiment, the signals from the cable data modems are encrypted before being transmitted by the wireless antenna of the protected state controller and the signals from the headend are encrypted before being transmitted by the wireless antenna of active state controller.

In one the preferred embodiment, the ACP protected state control packet and the ACP active state control packet are not sent to the headend.

In another preferred embodiment, a protected state ICMP alarm message is sent to the headend to provide notice that the cable path of the protected controller has failed.

In still another preferred embodiment, a protected state SNMP trap PDU alert message is sent to a network monitor to provide notice that the cable path of the protected controller has failed.

DESCRIPTION OF THE PREFERRED EMBODIMENTS

Figure 1:
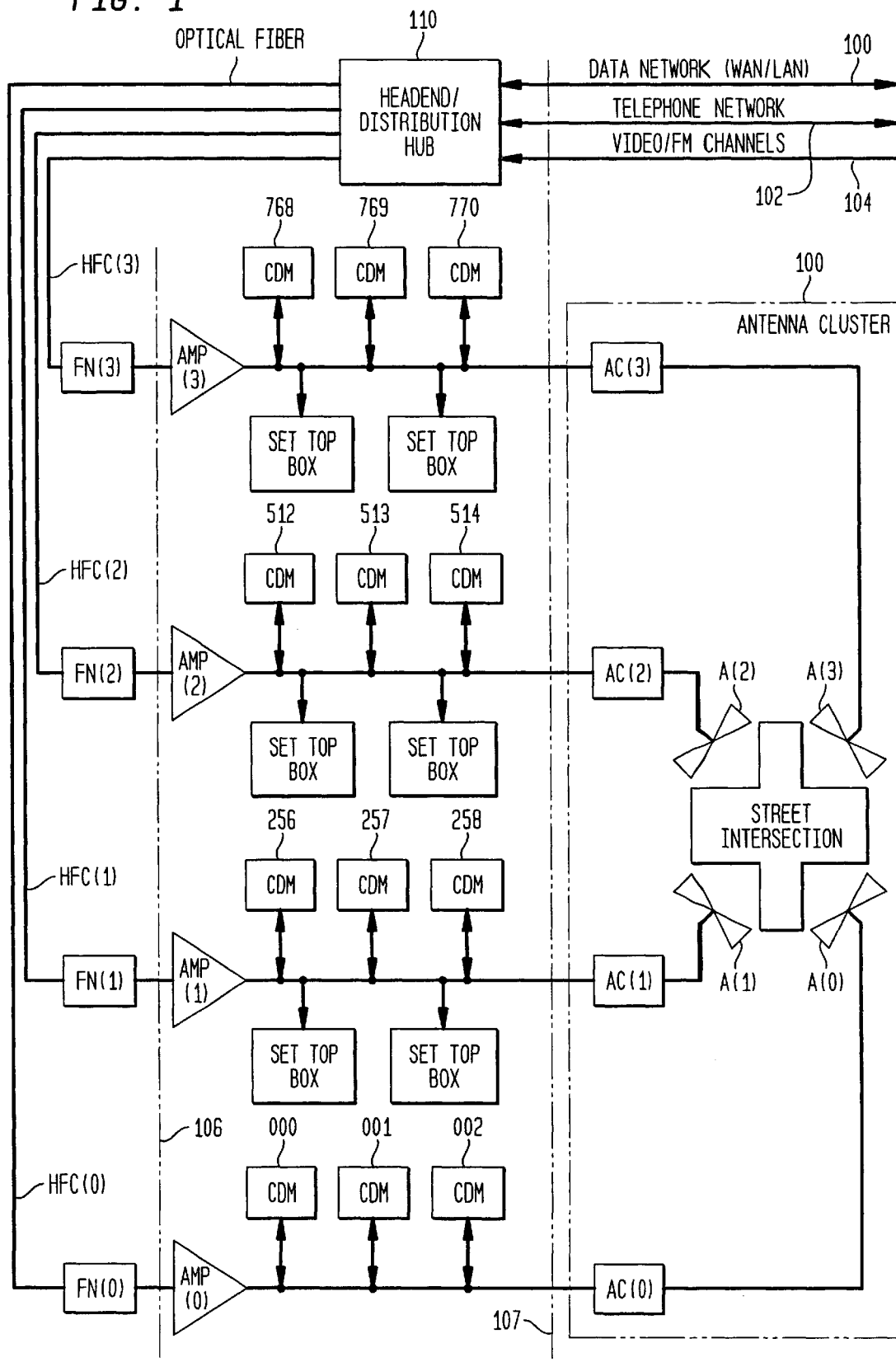
FIG. 1 is an overall network diagram of a cable access network, in accordance with the invention.

The communications network topology, in accordance with the invention, is shown in the network diagram of FIG. 1. The headend or distribution hub 110 is connected to an Internet Protocol Network which can be either a wide area network or a local area network 100. The external network 100 can have a network layer such as IP, IPX, X.25, or AppleTalk on top of an appropriate link layer or it can solely have a link layer such as Ethernet, ATM, FDDI, token ring, IEEE 802.3, or IEEE 802.12. It is also connected to a telephone network which can either be the public switched telephone network or a private telephone network 102. It is also connected to a source of video channels and FM audio channels 104. The headend or distribution hub 110 functions to distribute these signals over the hybrid fiber/coaxial cable (HFC) network to cable data modems (CDM) and set top boxes connected to respective coaxial cable distribution paths in the network. The hybrid fiber/coax cable network shown in FIG. 1 extends to the boundary 107, and includes the headend as well as the cables. Each hybrid fiber/coaxial cable, for example HFC(0) includes an optical fiber component connected to the headend 110 which goes through the fiber node FN(0) optical to electrical transducer and through an interface 106 into the coaxial cable distribution portion of the network which consists of an amplifier AMP(0) which delivers the electrical analog of the optical signals in the optical fiber portion of the cable. The electrical signals are exchanged with respective cable data modems CDM(000), for example, and are delivered to set top boxes, as shown in FIG. 1. The hybrid fiber/coaxial cable connected to the headend 110, provides connectivity for many cable data modems and set top boxes in a neighborhood or community, in the conventional manner.

Two standards for the transmission of data over cable networks are: (1) The IEEE 802.14 Cable-TV Access Method and Physical Layer Specification; and (2) The ITU Standard J112 Data over Cable Service Interface Specification (DOCSIS). These standards define modulation and protocols for high-speed bi-directional data transmissions over cable.

When a cable's connection to the headend 110 is accidentally interrupted, for example, by inadvertently cutting it or by the loss of electrical power to the amplifier AMP(0), service can be rapidly restored to the affected cable data modems and set top boxes attached to the cable, by means of the invention disclosed herein.

As is shown in FIG. 1, each respective hybrid fiber/coaxial cable HFC(0), HFC(1), HFC(2), and HFC(3) is attached to a respective autonomous controller AC(0), AC(1), AC(2), and AC(3). Each autonomous controller includes a wireless receiver, a wireless transmitter, and an antenna, shown respectively as antennas A(0), A(1), A(2), and A(3), in FIG. 1. The antenna, transmitter, and receiver are preferred to have a bandwidth sufficient to handle the CATV downstream and upstream frequency bands shown in FIG. 6. Typically, the autonomous controller is connected near the end of the hybrid fiber/coaxial cable which is remote from headend 110. An autonomous controller and its antenna and the coaxial cable with which it is connected, typically serve an individual neighborhood or community. As is shown in FIG. 1, four neighborhoods are represented, divided by a street intersection. Each of the respective four neighborhoods is served by corresponding hybrid fiber/coaxial cable HFC(0) though HFC(3). Each hybrid fiber/coaxial cable is connected to the same headend or distribution hub 110, and it provides connectivity for the cable data modems (CDM) and the set top boxes in the respective neighborhoods or communities. Each respective hybrid fiber/coaxial cable is attached to its own respective autonomous controller AC(0), for example, which has a wireless receiver, wireless transmitter and a wireless antenna A(0), for example. The four antennas shown in FIG. 1 constitute an antenna cluster 100.

Figure 2A:
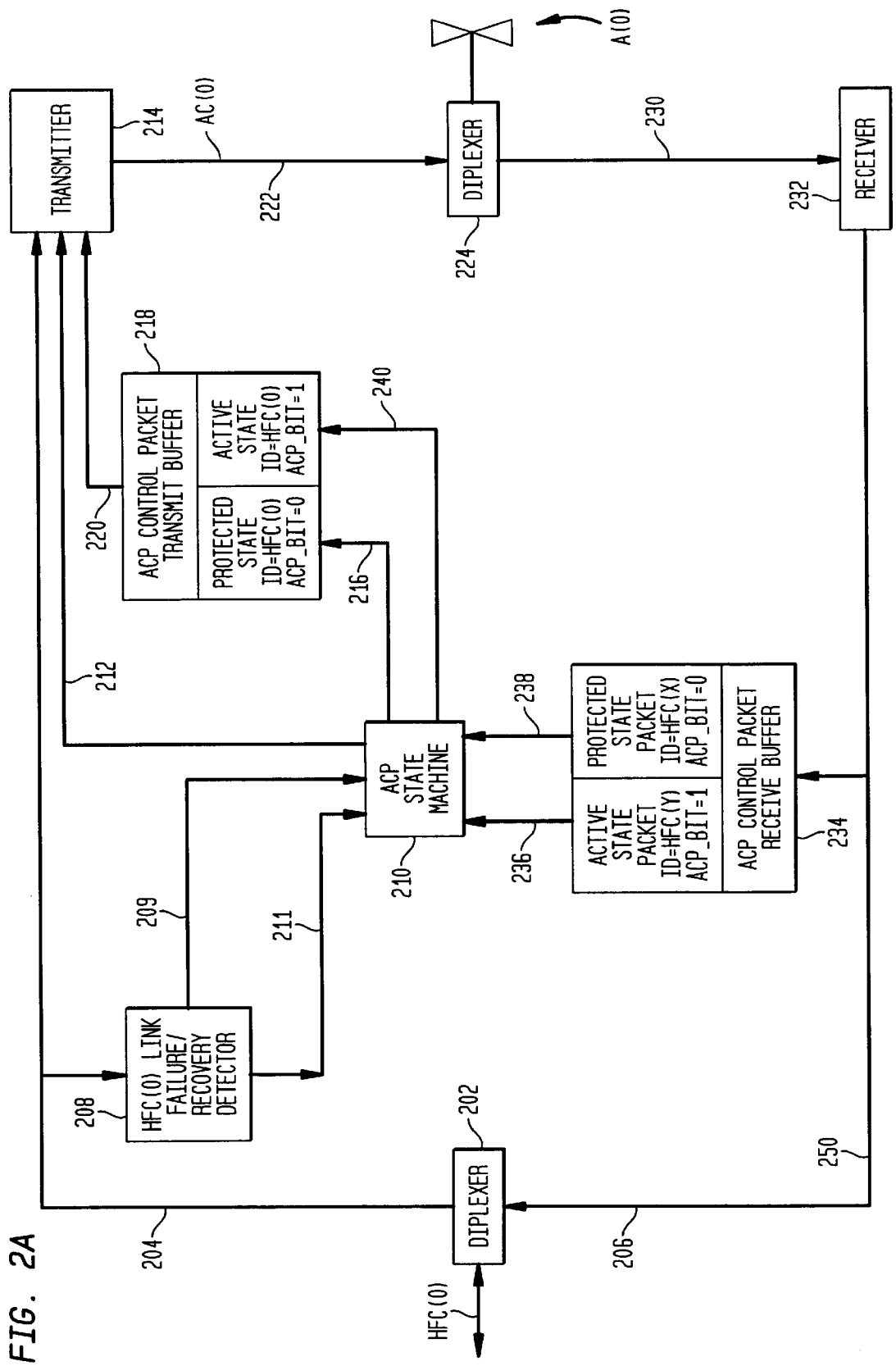
FIG. 2A is a functional block diagram of the autonomous controller, in accordance with the invention.

When a cable's connection to the common headend is interrupted, thereby preventing service to its neighborhood, its autonomous controller, shown in FIG. 2A, senses the interruption and responds by sending a wireless signal to the controllers in the adjacent neighborhoods. In response, one of the controllers in one of the adjacent neighborhoods uses the antenna cluster protocol (ACP) to set up a wireless communications path though the second controller and its own hybrid fiber/coaxial cable, to the headend 110. In this manner, service can be restored from the headend to the cable data modems and set top boxes in the neighborhood suffering the outage.

Figure 3A:
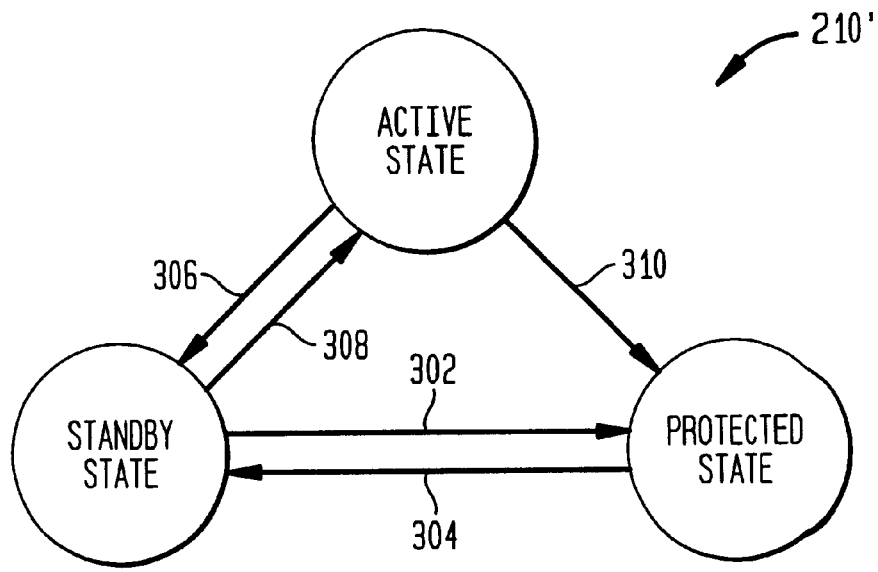
FIG. 3A is a state diagram of the antenna cluster protocol.

The antenna cluster protocol (ACP) is based on each autonomous controller including a state machine having a standby state, a protected state, and an active state, as is illustrated in the state diagram 210' of FIG. 3A. During normal operation of the cable, the autonomous controller AC(0) of FIG. 2A detects signals arriving from the headend via the cable using the link failure/recovery detector 208.

The detector 208 can monitor the receipt of a prespecified combination of video channel signals, for example, which are always being transmitted from the headend. Absence of such signals indicates a failure in the cable.

The detector 208 provides a fail signal 209 or alternately a recovery signal 211 to the ACP state machine 210 of FIG. 2A, which operates in accordance with the state diagram of FIG. 3A. The state machine 210 in the controller AC(0) uses this indication of a signal from the headend in order to remain in the standby state. When in the standby state, the wireless receiver 232 shown in FIG. 2A continues operating to receive any wireless signals on an upstream frequency via the antenna A(0) from other antennas, for example A(1), in the antenna cluster 100. While in the standby state, the wireless transmitter 214 of FIG. 2A is turned off to conserve power.

When the signals from the headend through the cable HFC(0) fail to be received at the controller AC(0), as determined by the detector 208, a fail signal 209 to the ACP state machine 210, causes the state machine to change to the protected state, as is shown by the transition 302 in FIG. 3A. In the protected state, the controller AC(0) turns on its transmitter 214 and an ACP control packet is transmitted from the ACP control packet transmit buffer 218 through the transmitter 214 and the diplexer 224 and the antenna A(0) to the other antennas in the antenna cluster 100 on the upstream frequency. This ACP control packet as is shown in the buffer 218 of FIG. 2A, identifies the sender as HFC(0) and indicates that the sender is now in the protected state by virtue of the ACP bit being set equal to 0. The ACP state machine 210 provides an enabling signal on line 216 to the buffer 218 to output the ACP protected state control packet. Since any other controllers, for example, AC(1), AC(2), AC(3) in the same cluster 100 will be receiving on the same upstream frequency, they are immediately made aware of the outage condition that has occurred on the hybrid fiber cable HFC (0). Upon changing to the protected state, the wireless receiver 232 in the controller AC(0) changes its receiving frequency to a downstream frequency.

Figure 7A:
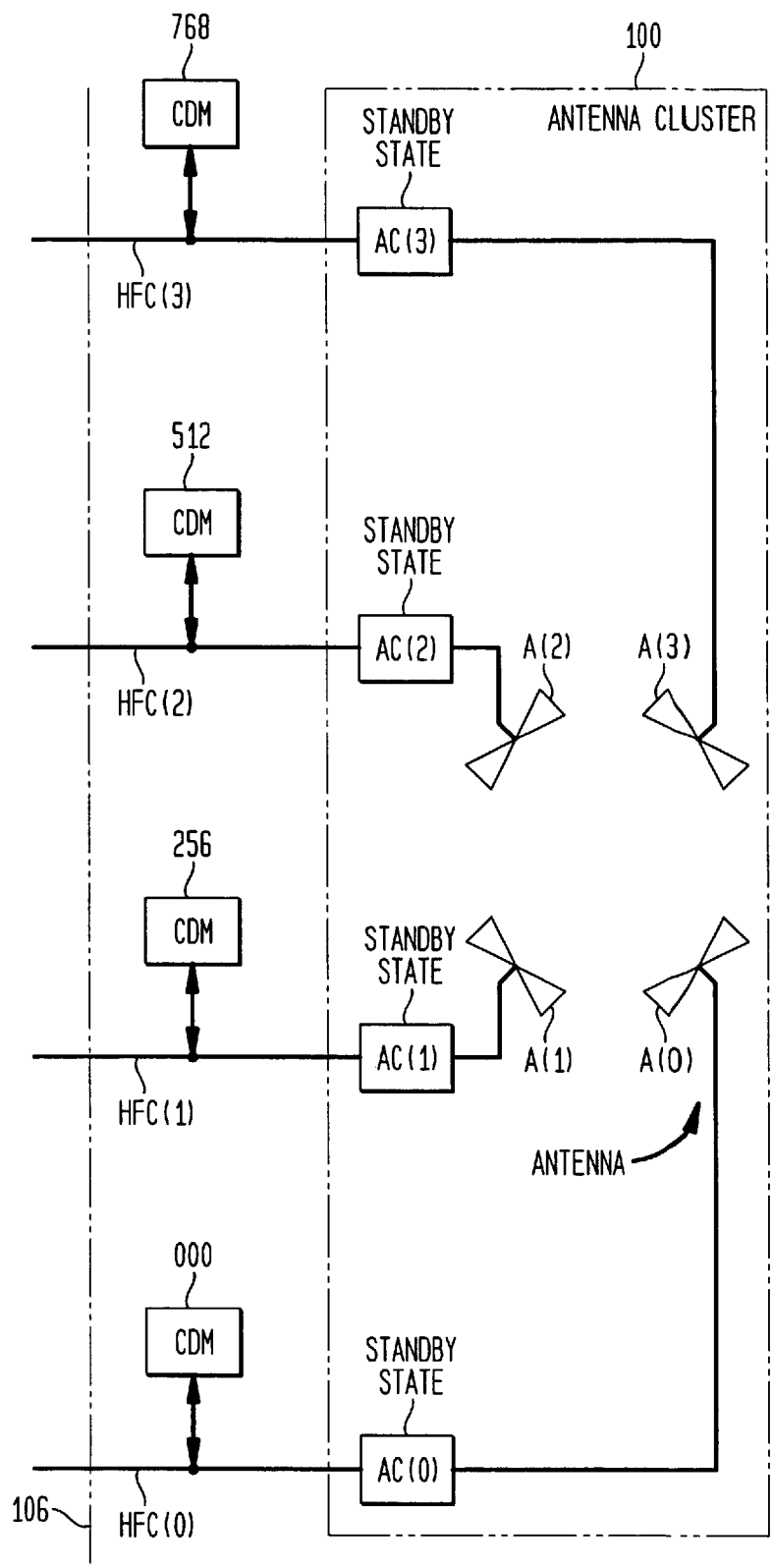
FIG. 7A illustrates an antenna cluster with all autonomous controllers in the standby state.
Figure 7B:
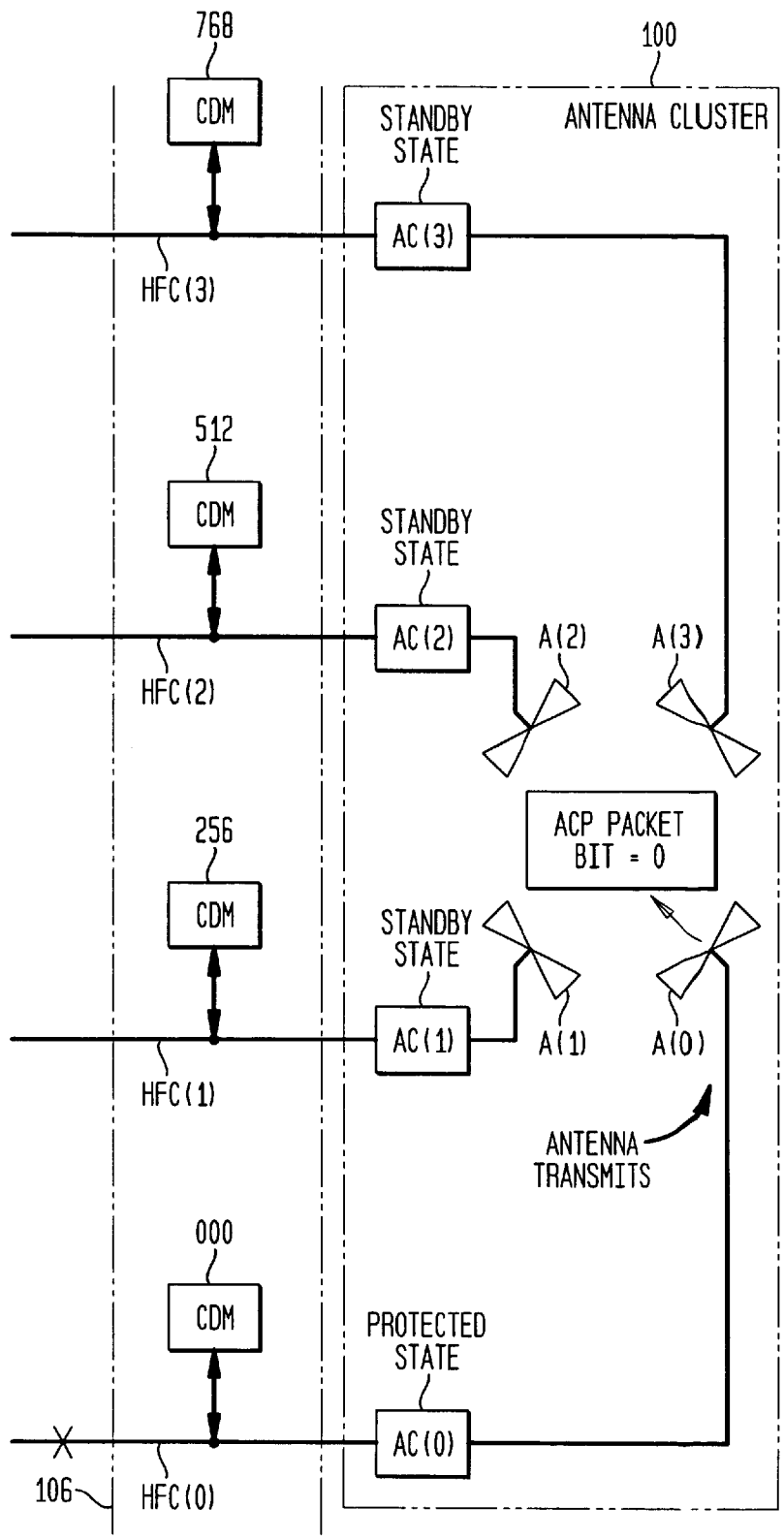
FIG. 7B illustrates an antenna cluster with one autonomous controller in the protected state.
Figure 7C:
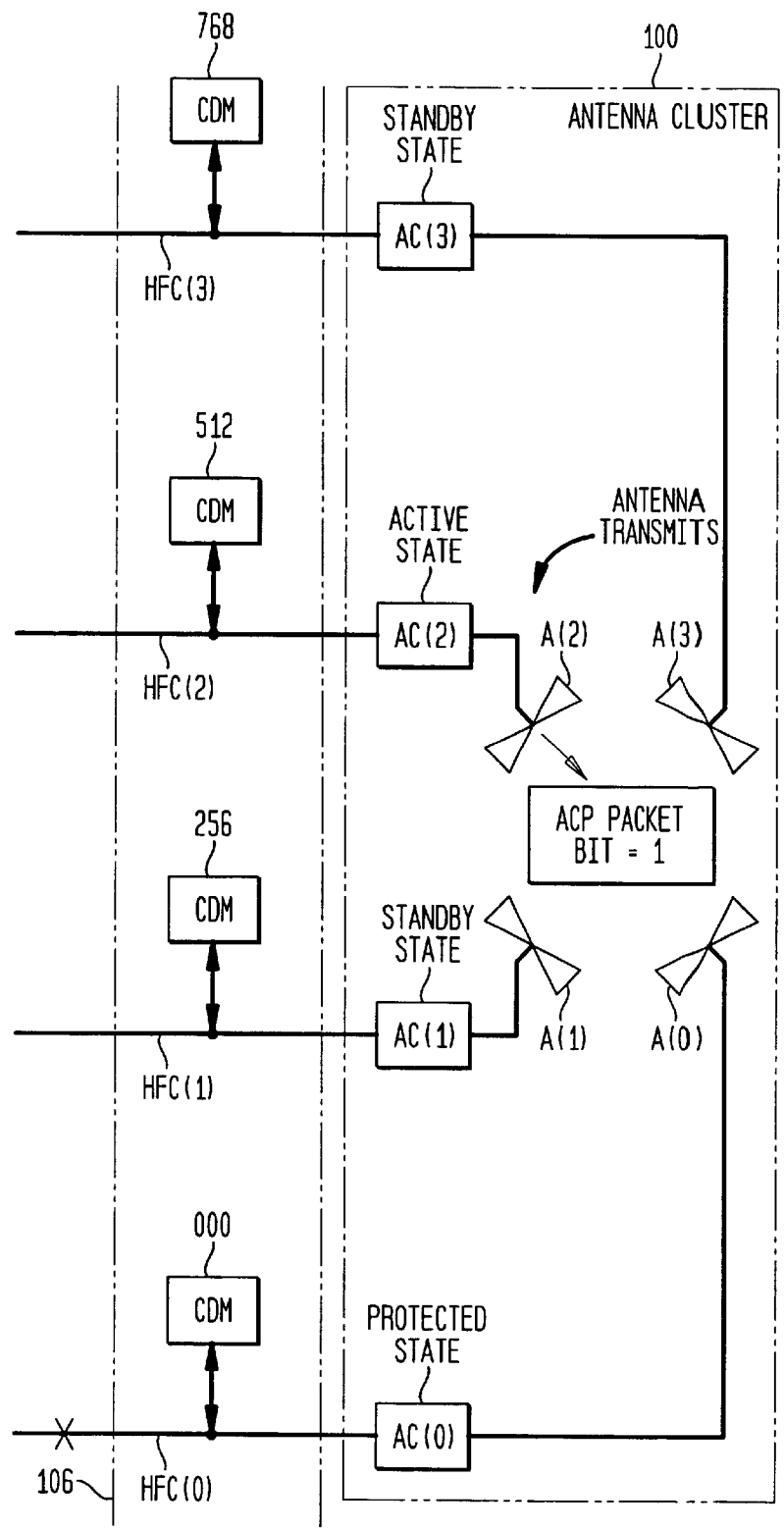
FIG. 7C illustrates an antenna cluster with a first autonomous controller in a protected state and a second controller in the active state.
Figure 7D:
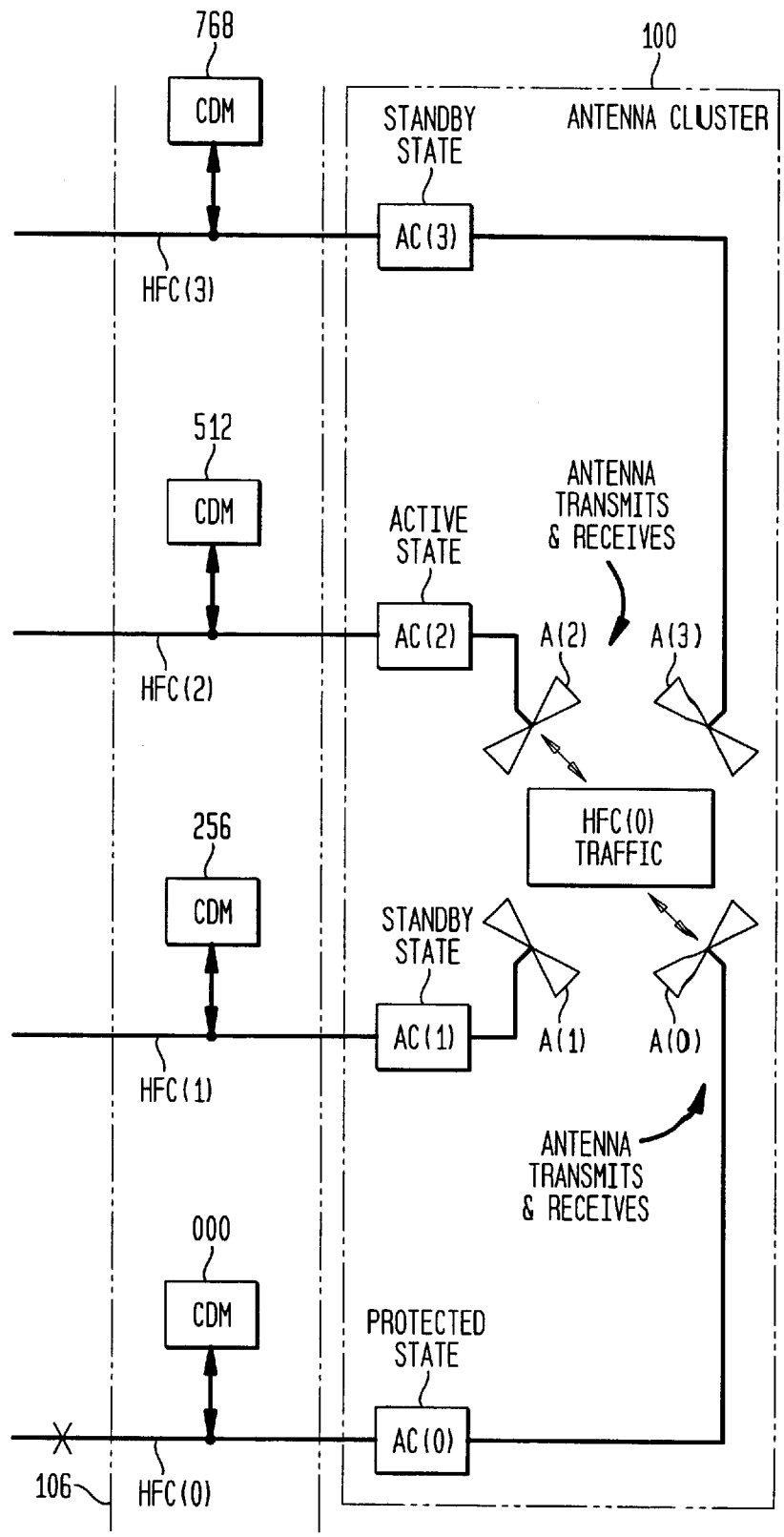
FIG. 7D illustrates the communication of traffic between a protected state controller to an active state controller.
Figure 13:
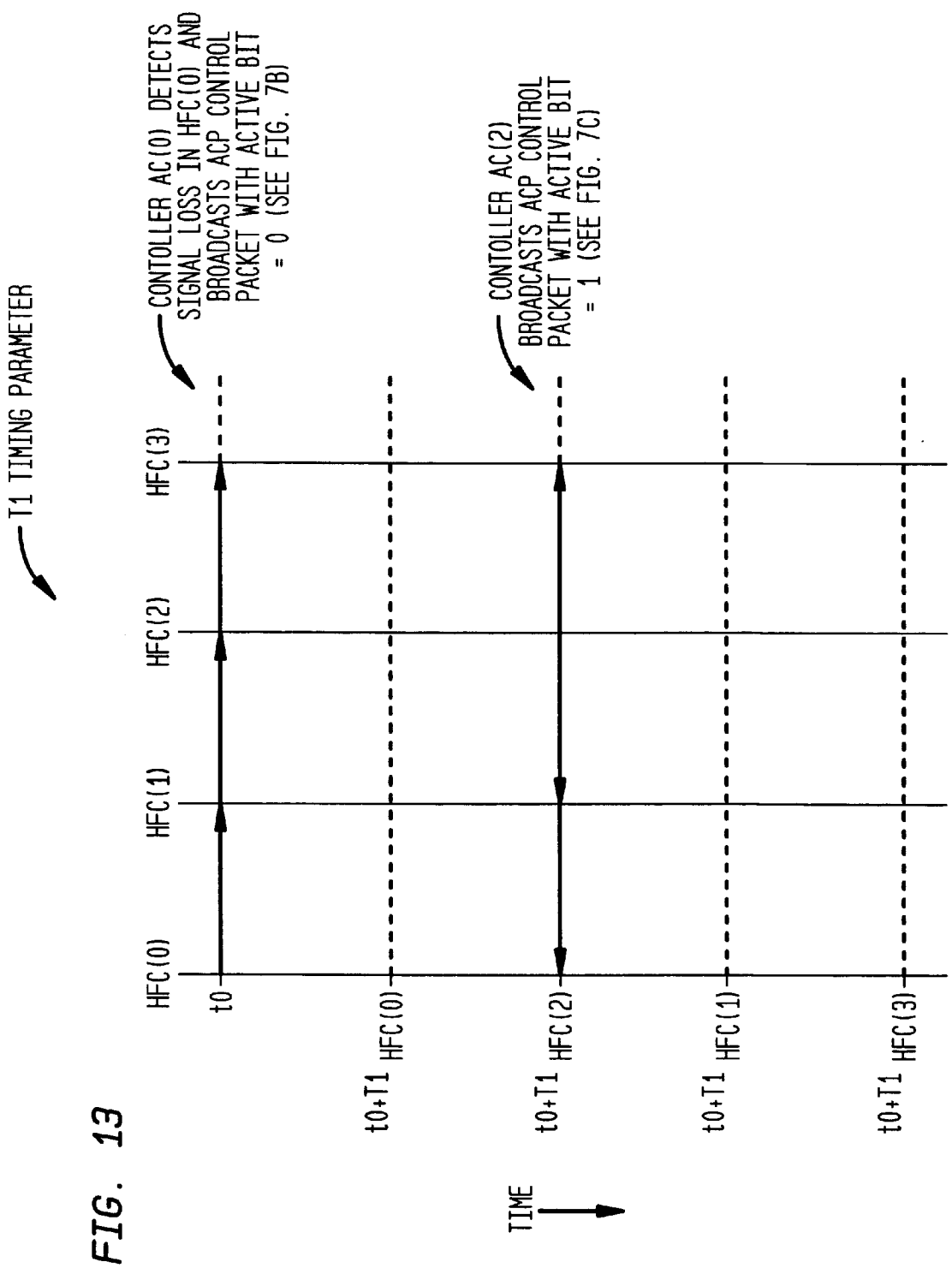
FIG. 13 is a timing diagram illustrating the operation of the T1 timing parameter.

Each controller AC(0) through AC(3) in the antenna cluster 100 is preassigned a distinct time interval value T1 to wait while in the standby state before responding to the receipt of the ACP protected state control packet. The operation of the timing parameter T1 is shown in FIG. 13 where the controller AC(0) has a T1 timing parameter of $T1_{HFC(0)}$ and where the controller AC(2) has a T1 timing parameter of $T_{1HFC(2)}$ which is a longer waiting time than the waiting time for the controller AC(0). As is shown in FIG. 13, at time T0, the controller AC(0) detects the signal loss in HFC(0) and it then broadcasts an ACP control packet with the active bit set equal to 0, indicating protected state. This transition is illustrated in the sequence of FIGS. 7A and 7B. FIG. 7A shows all four autonomous controllers in the antenna cluster 100 being in the standby state whereas FIG. 7B shows that the cable HFC(0) has suffered a failure, thereby causing the autonomous controller AC(0) to enter into the protected state and to transmit an ACP protected state control packet with a bit set equal to 0. The state machine in that particular controller having the shortest waiting interval T1 changes from the standby state to the active state in response to having received the ACP protected state control packet from another controller in the cluster 100. As is shown in the timing diagram of FIG. 13, the controller AC(2) has the shortest T1 timing interval after AC(0), which has suffered a failure. Accordingly, the controller AC(2) broadcasts an ACP active state control packet with the active bit set equal to 1, indicating that it has entered into the active state. This is illustrated in the state diagram of FIG. 3A for the transition 308. This is also illustrated for the antenna cluster 100 shown in FIG. 7C where the autonomous controller AC(2) enters the active state in response to having received the protected state packet from the protected state controller AC(0), and the active state controller AC(2) then transmits an ACP packet with the bit set equal to 1. The ACP state machine 210 of FIG. 2A outputs an enabling signal on line 240 to the ACP control packet transmit buffer 218 for the autonomous controller AC(2), to output the ACP active state control packet with an identity of HFC(2) and the ACP bit set equal to one. The ACP active state control packet is transmitted to line 220 and through the transmitter 214 over the line 222 and a diplexer 224 and the antenna A(2) to the other antennas in the antenna cluster 100 of FIG. 1. Thus, in response to having received ACP protected state control packet from the autonomous controller AC(0), the second controller AC(2) changes to the active state. In the active state, the second controller's transmitter is turned on using line 212 of FIG. 2A and the ACP active state control packet is transmitted to the other antennas in its cluster on the downstream frequency. This ACP active state control packet identifies the sender as AC(2) and indicates that the controller AC(2) is in the active state. Since only controllers that are in the protected state, such as controller AC(0) can receive on the downstream frequency, the protected state controllers are immediately made aware that there is a controller available providing an alternate path to the headend 110 to circumvent the outage condition that has occurred on the cable HFC(0). Once the first and second controllers AC(0) and AC(2) have identified themselves to each other as being in the protected and active states, respectively, the antenna cluster protocol (ACP) enables traffic signals to pass to and from the first controller AC(0) via its wireless antenna A(0) to the wireless antenna A(2) of the second controller AC(2) for transmission through the second cable path HFC(2) to and from the common headend 110. This is illustrated in FIG. 7D. In this manner, the outage condition that has occurred on the first cable HFC(0) is circumvented.

Figure 3B:
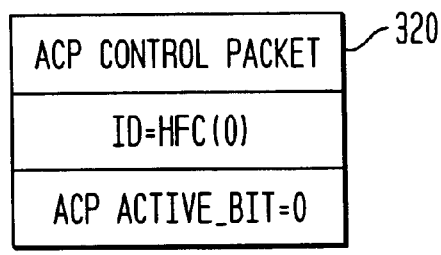
FIG. 3B illustrates an ACP control packet for a controller in the protected state.
Figure 3C:
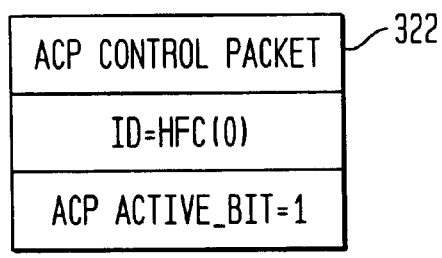
FIG. 3C illustrates an ACP control packet for a controller when in the active state.

FIG. 3B illustrates the ACP protected state control packet 320 transmitted by HFC(0) controller AC(0) when in the protected state. FIG. 3C illustrates the ACP active state control packet 322 transmitted by the controller AC(0) if it had gone into the active state.

When a controller such as the autonomous controller AC(0) of FIG. 2A receives an active state packet from another controller in its antenna cluster, it is buffered in the ACP control packet receive buffer 234. Similarly, if a protected state packet is received from another controller in the antenna cluster 100, it is buffered in the ACP control packet receive buffer 234. Lines 236 and 238 provide informational signals to the ACP state machine 210 concerning the receipt of active state ACP active state control packets or ACP protected state control packets by a controller.

Figure 7E:
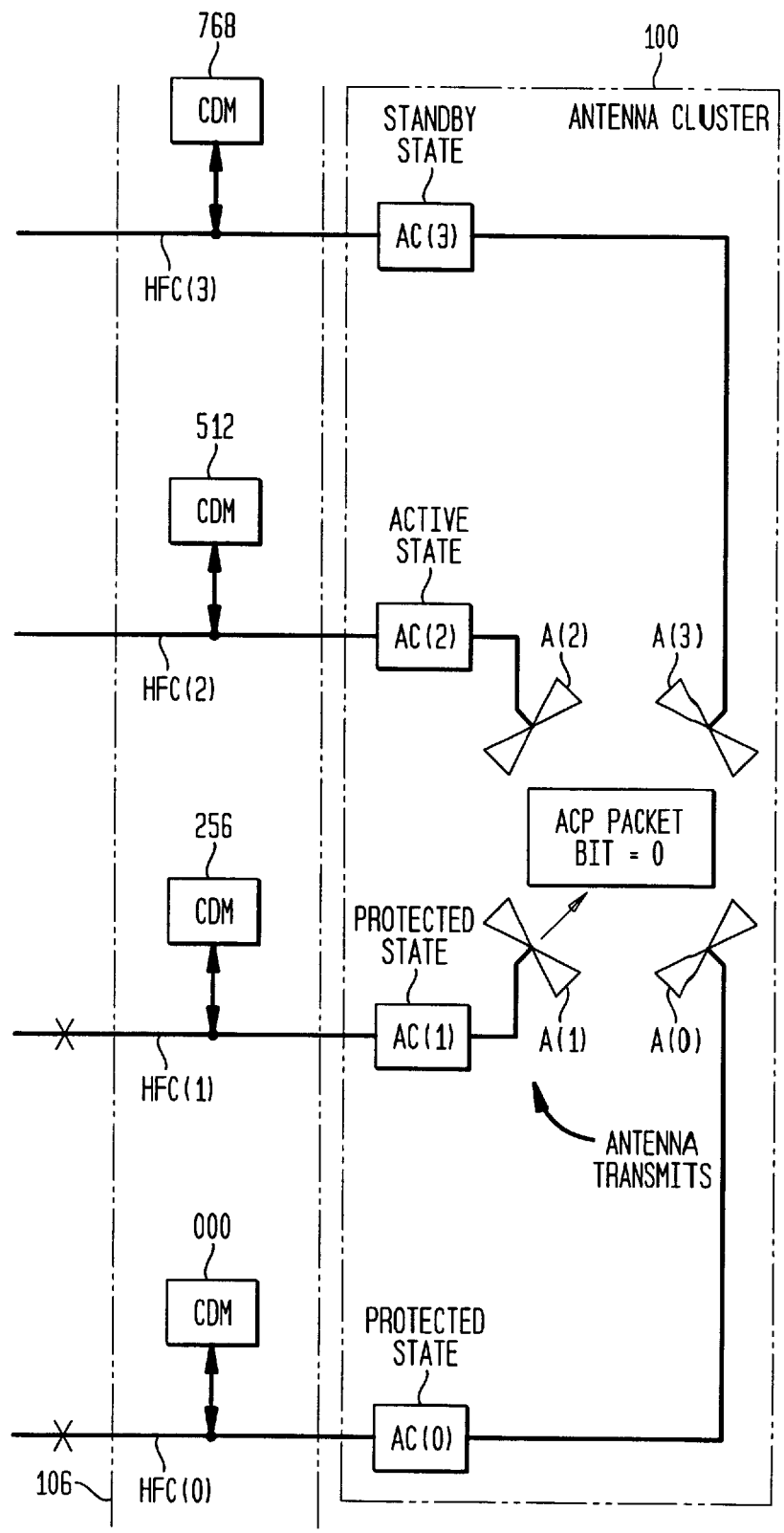
FIG. 7E illustrates an antenna cluster with two autonomous controllers in the protected state and one controller in the active state.
Figure 7F:
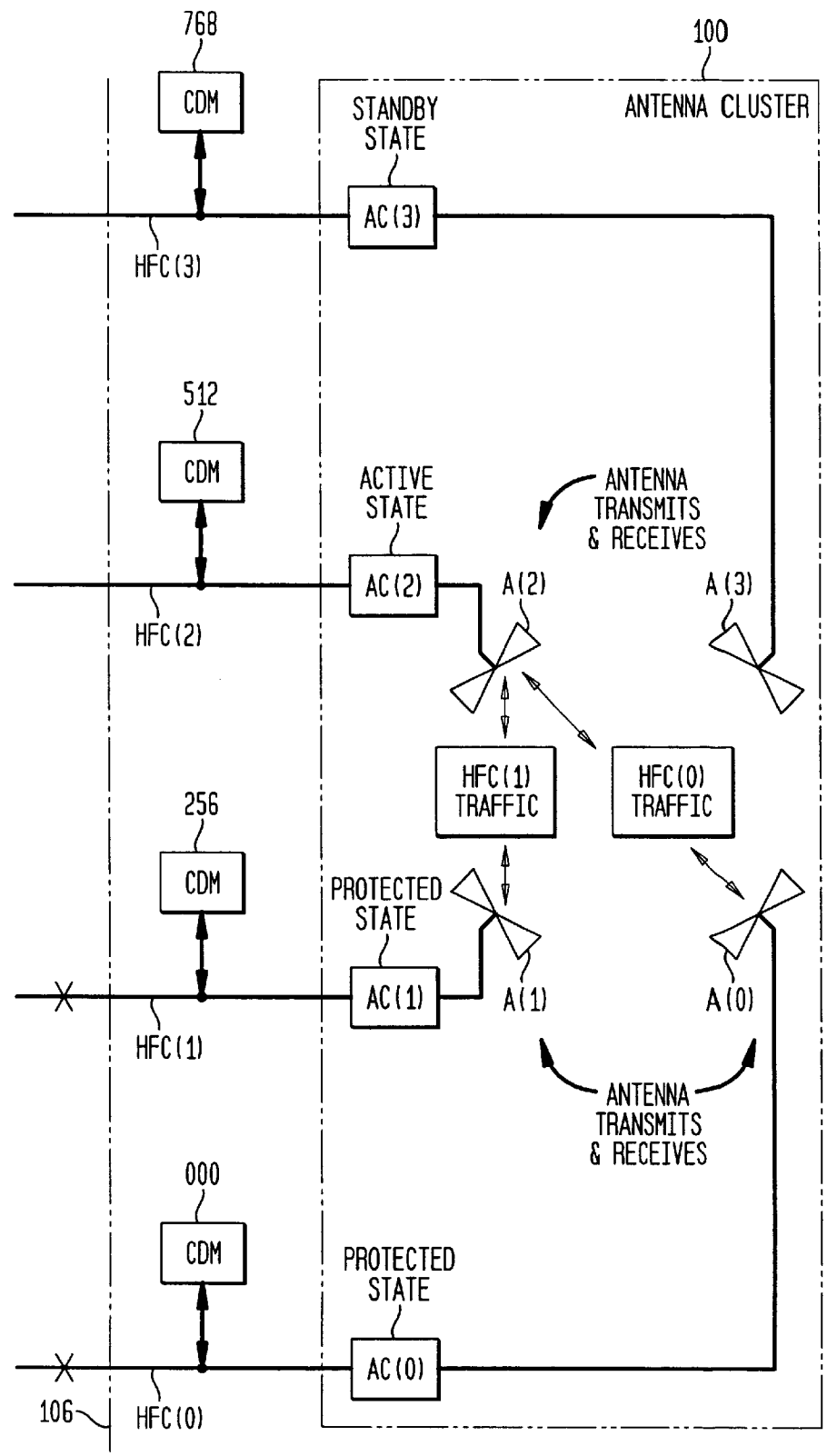
FIG. 7F illustrates an antenna cluster with two autonomous controllers in the protected state exchanging traffic with a third autonomous controller in the active state.
Figure 7G:
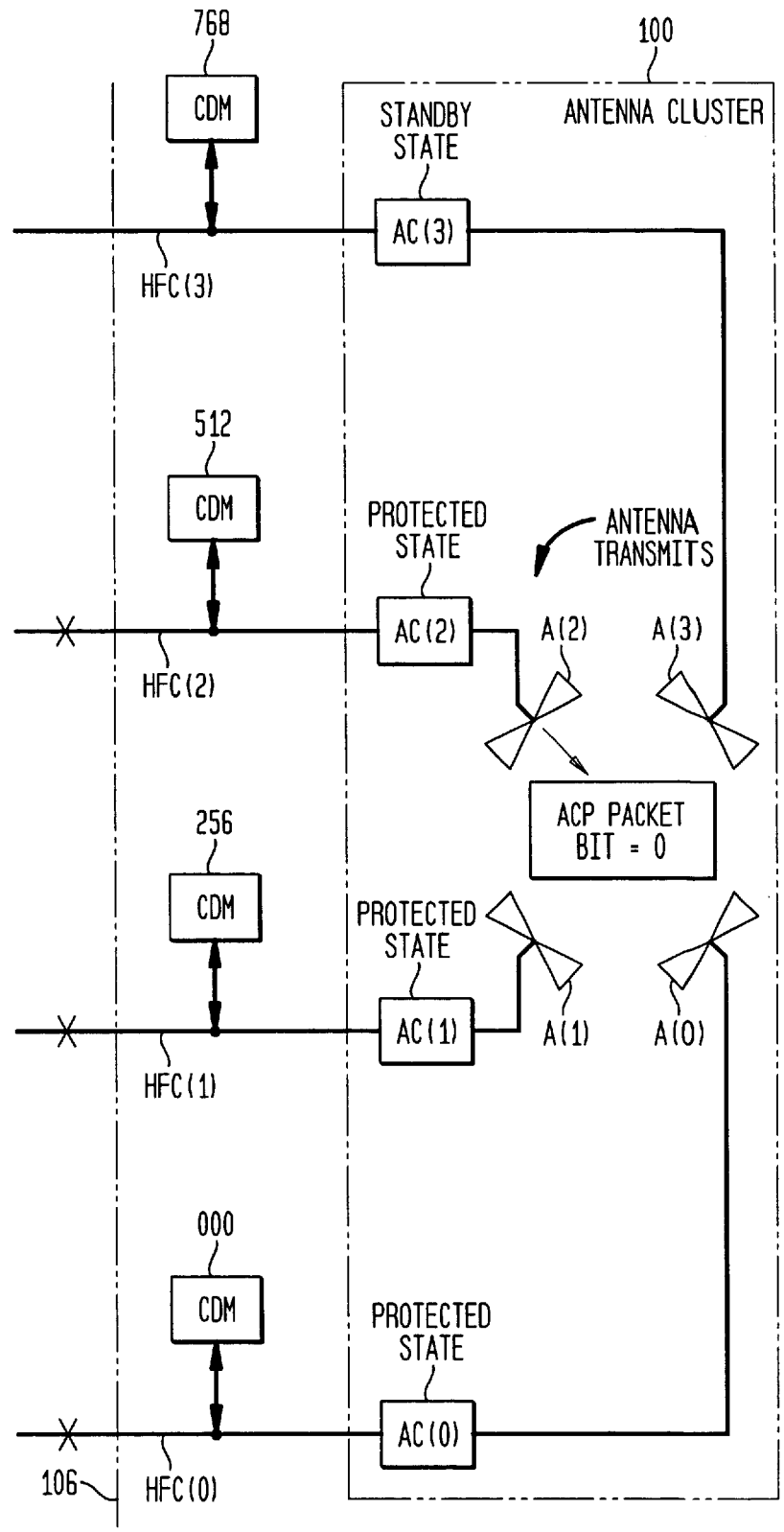
FIG. 7G illustrates an antenna cluster with an active state controller changing to the protected state.
Figure 7H:
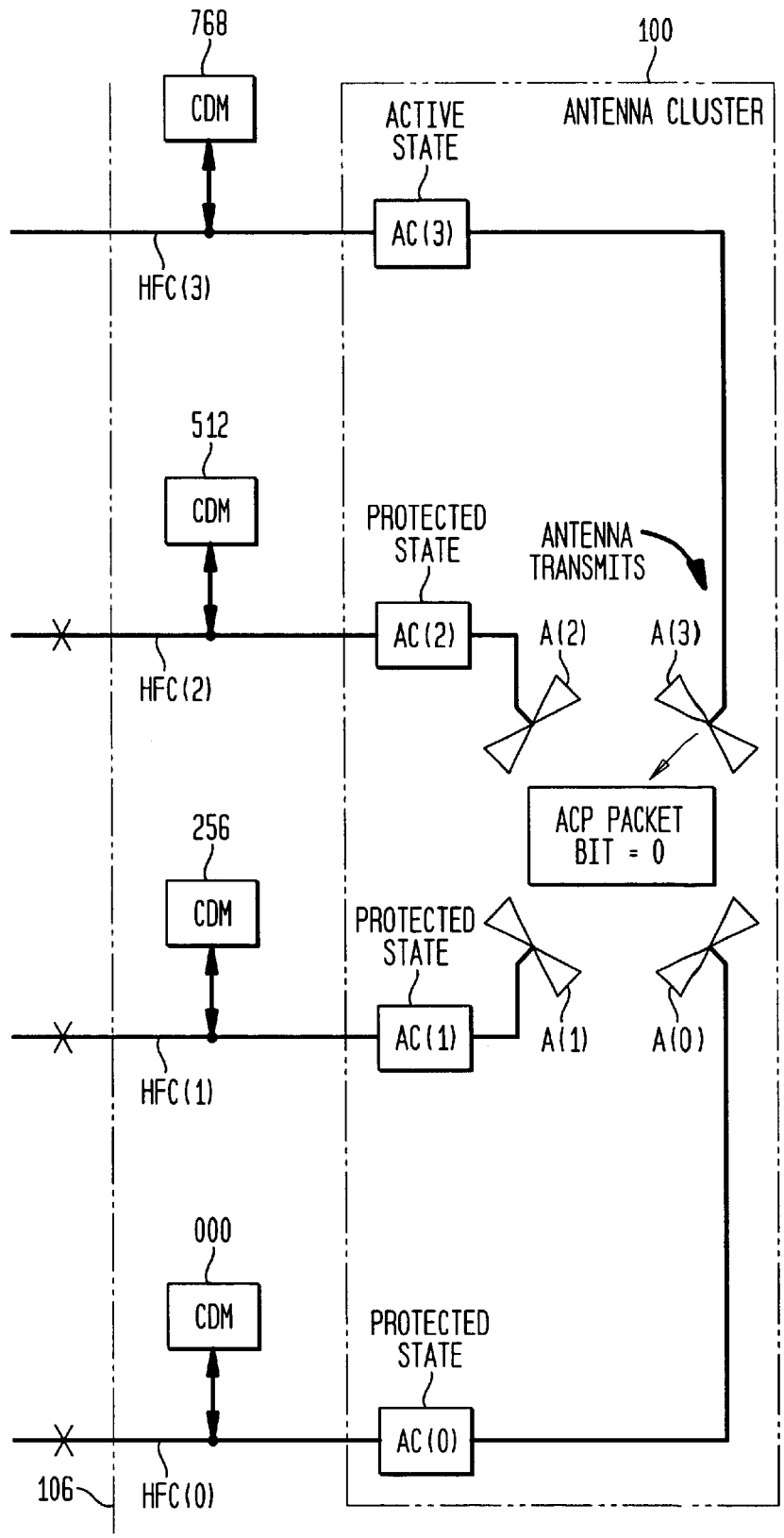
FIG. 7H illustrates an antenna cluster with three autonomous controllers in the protected state and one autonomous controller in the active state.
Figure 7I:
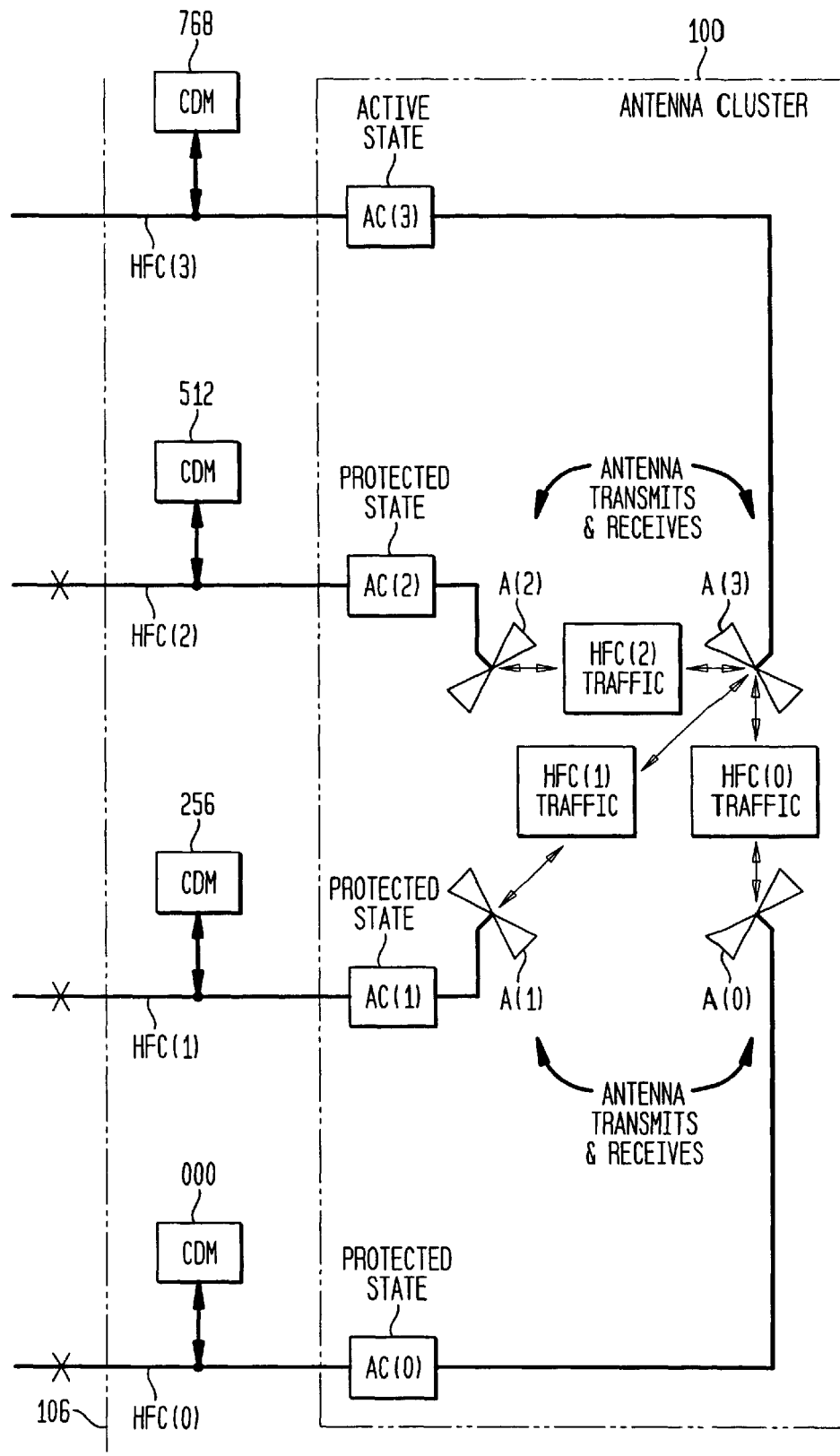
FIG. 7I illustrates an antenna cluster with three protected state controllers exchanging traffic with one active state controller.

The active state controller can exchange traffic signals with the headend for a plurality of protected state controllers in the same antenna cluster 100, through the active controller's hybrid fiber/coaxial cable path. This is illustrated in FIGS. 7E, 7F, 7G, 7H and 7I. In FIG. 7E, a second hybrid fiber/coaxial cable HFC (1) suffers an outage and its corresponding autonomous controller AC(1) transmits an ACP protective state control packet. In FIG. 7F, the active state controller AC(2), which has been exchanging traffic with the first protected state controller AC(O), now proceeds to also exchange traffic with the second protected state controller AC(1). As further shown in FIG. 7G, the controller AC(2) which was in the active state in FIG. 7F, has now suffered an outage in its hybrid fiber/coaxial cable HFC(2). According to the state diagram of FIG. 3A, the transition 310 occurs changing the active state of controller AC(2) to the protected state. In FIG. 7G, the controller AC(2) which is now in the protected state, transmits an ACP protected state control packet. Then in FIG. 7H, the controller AC(3) which was in the standby state in FIG. 7G, receives ACP packets but they are all protected state packets, none has the active bit set equal to one. Thus, in accordance with transition 308 in the state diagram of FIG. 3A, the controller AC(3) transitions to the active state, as shown in FIG. 7H. As is seen in FIG. 7H the active state controller AC(3) now transmits an ACP active state control packet. Then in FIG. 7I, all three protected state controllers AC(0), AC(1) and AC(2), now exchange traffic with the active state controller AC(3), which transfers that traffic over its hybrid fiber/coaxial cable HFC (3) to the common headend distribution hub 110.

To prevent more than one controller at a time from remaining in the active state, each of the controllers AC(0) to AC(3) has a unique identity and priority while remaining in the active state. If an active state controller determines that there is another active state controller having a higher priority, then the lower priority controller reverts to the standby state. This is shown in the transition 306 of FIG. 3A.

A controller in the protected state periodically broadcasts an ACP protected state control packet until its cable is repaired or until it is taken off line. The active state controller in the same cluster 100 monitors these ACP protected state control signals and when they are no longer received, the active state controller reverts to the standby state. This is shown in transition 306 in the state diagram of FIG. 3A.

A controller in the protected state continues to monitor for the resumption of the signals arriving from the headend 110 via its cable HFC(0), for example, and its state machine uses this condition of absence of such signals, in order to remain in the protected state. When the signals from the headend 110 through the cable HFC(0) are once again received by the protected state controller, as detected by the detector 208 in FIG. 2A, then the recover signal 211 is applied to the ACP state machine 210 which changes to the standby state. This is shown in the transition 304 of the state diagram of FIG. 3A.

An active state controller continues to detect the signals arriving from the headend 110 via its cable HFC(0), and its state machine 210 uses this indication to remain in the active state. When the signals from the headend 110 through the cable HFC(0) fail to be received at the active state controller, it changes to the protected state. This is shown in the transition 310 of the state diagram of FIG. 3A. Then, another standby state controller in the same antenna cluster 100, will change its state to the active state. The antenna cluster protocol (ACP) enables traffic signals to and from the old active state (which is now in the protected state) controller to pass via their respective wireless antennas to the new active state controller for transmission through the new active state controller's cable path to and from the common headend 110. This was shown in FIGS. 7H and 7I, previously discussed.

In one preferred embodiment, the ACP protected state control packet 320 shown in FIG. 3B is an ICMP message broadcast via the wireless antenna of the controller in the protected state, and the ACP active state control packet 322 shown in FIG. 3C is an ICMP message broadcast via the wireless antenna of the controller in the active state. ICMP messages are described in greater detail in the book by Douglas E. Comer, "Internet Working with TCP/IP, Vol. I: Principles, Protocols, and Architecture", Third Edition, 1995, published by Prentice-Hall.

In one preferred embodiment, the signals from the cable data modems are encrypted in the autonomous controller before being transmitted by the wireless antenna for a controller in the protected state. Also, the signals from the headend 110 are encrypted by the autonomous controller before being transmitted by the wireless antenna for a controller in the active state. Suitable encryption techniques are described, for example, in the book by Carl H. Meyer and Stephen M. Matyas, "A New Dimension in Computer Data Security Cryptography", published by John Wiley & Sons, 1982.

In one preferred embodiment of the invention, as is illustrated by the controller diagram of FIG. 2A, the ACP protected state control packet 320 in FIG. 3B and the ACP active state control packet 322 in FIG. 3C are not sent to the headend 110.

Figure 2B:
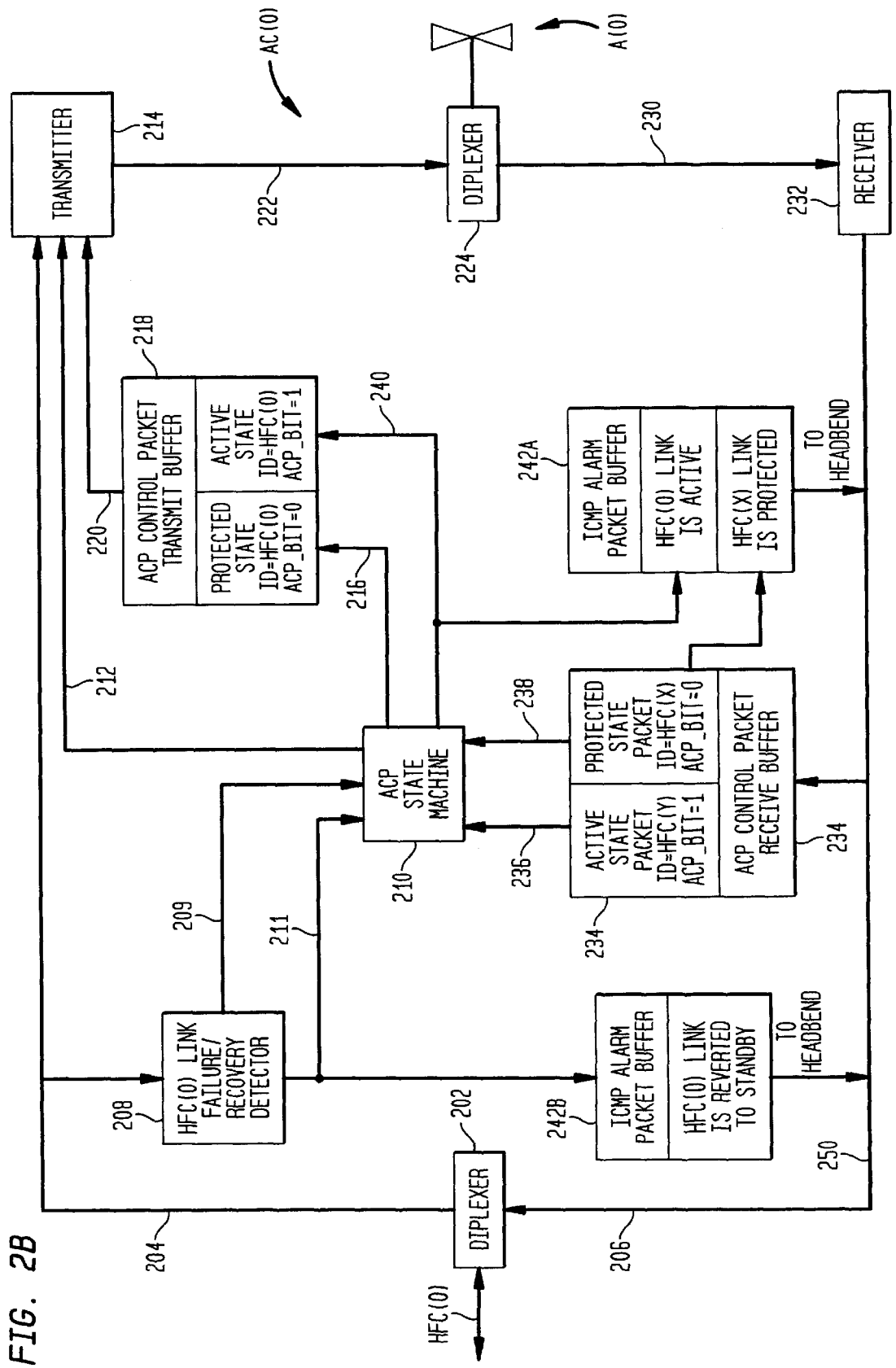
FIG. 2B is a functional block diagram of another embodiment of the autonomous controller, in accordance with the invention.
Figure 4:
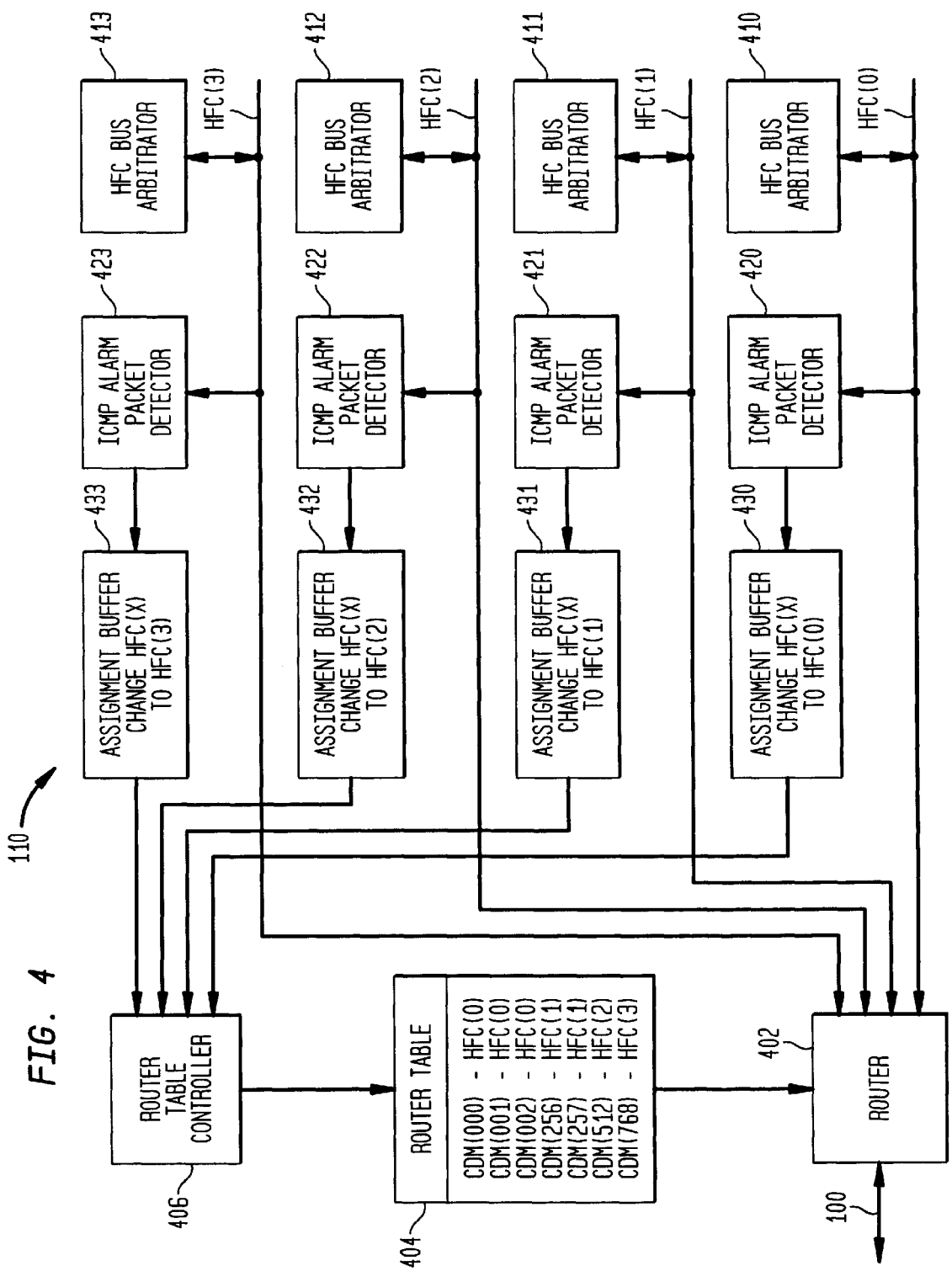
FIG. 4 is a functional block diagram of a headend or distribution hub.

FIG. 2B illustrates an alternate embodiment of the autonomous controller wherein an ICMP alarm packet buffer 242 A and B are included. When the ACP state machine 210 determines that the autonomous controller AC(0) must enter into the active state in response to having received an ACP protected state control packet from another controller for an outage on a hybrid fiber/coaxial cable HFC(x), then the ICMP alarm packet buffer 242A sends an ICMP message over the cable HFC(0) to the headend 110 which includes information that the HFC(0) link is now active and that the HFC(x) link is now protected. Later, when the autonomous controller AC(0) reverts back to its standby state, either by transition from a previous active state or by transition from a previous protected state, then the ICMP alarm packet buffer 242B of FIG. 2B outputs an ICMP message over the cable HFC(0) to the headend 110 with information that the HFC(0) link is reverted to standby. This information can be used at the headend or distribution hub 110 illustrated in FIG. 4 to reconfigure a router table 404 to reroute IP packets of traffic from a failed hybrid fiber/coaxial cable, for example HFC(0), to an active hybrid fiber/coaxial cable HFC(2), for example. In the headend distribution hub 110 of FIG. 4, each respective hybrid fiber/coaxial cable, for example HFC(0), has its IP packets controlled by the HFC bus arbitrator 410. When an ICMP alarm packet is sent from the autonomous controller AC(0) to the headend or distribution hub 110, it is detected by the ICMP alarm packet detector 420 which outputs information contained in the packet to the assignment buffer 430 to change the router designation for HFC(x) for a failed hybrid fiber/coaxial cable, to the designation HFC(0) for the active hybrid fiber/coaxial cable. That new routing assignment is sent to the router table controller 406 which controls the router table 404 to perform the desired assignment change. Router table 404 governs the routing of IP traffic packets by the router 402 between the IP network 100 and the cable data modems connected to the failed hybrid fiber/coaxial cable HFC(0) and the active hybrid fiber/coaxial cable HFC(2).

Figure 2C:
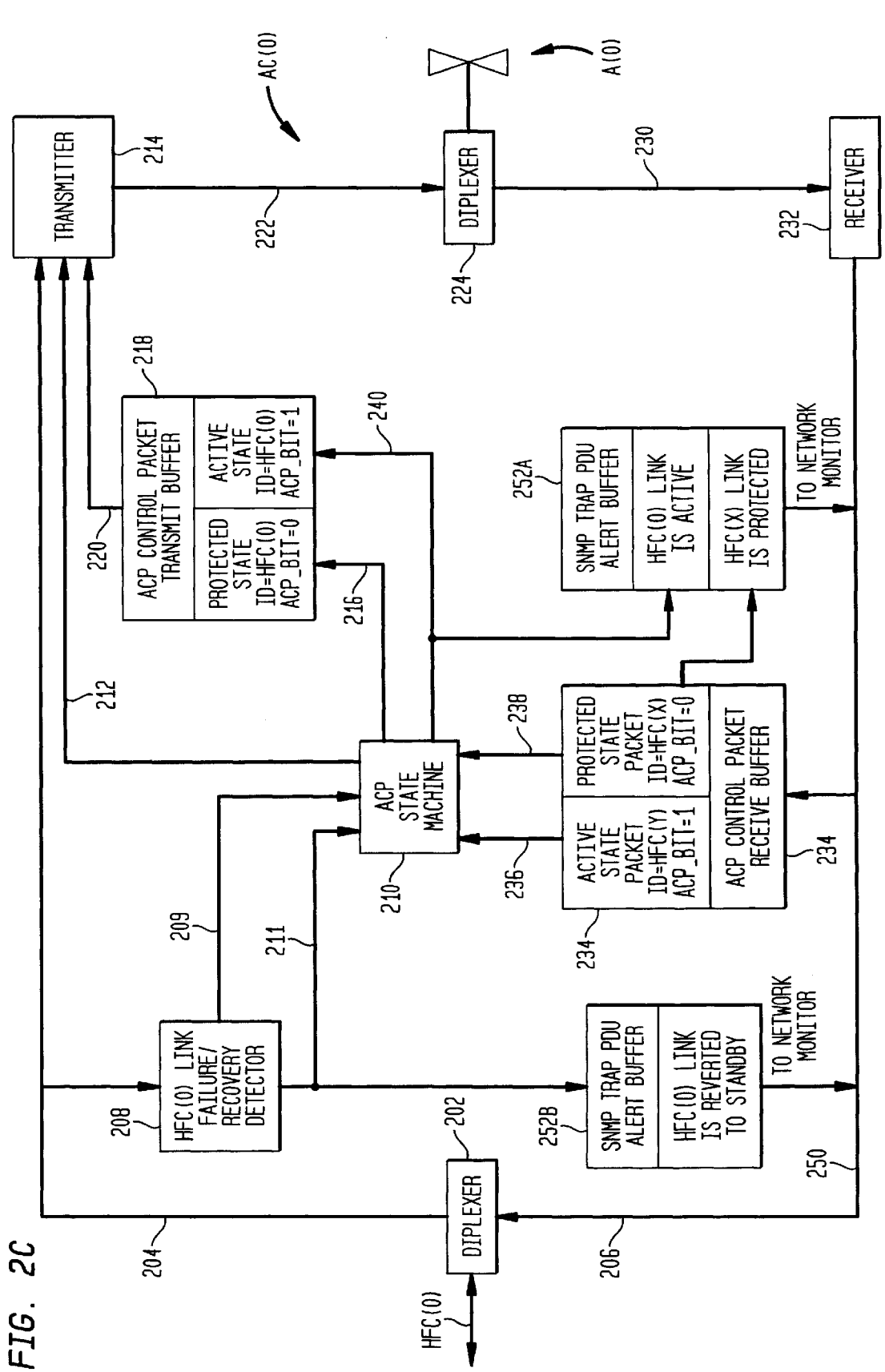
FIG. 2C is still another embodiment of the autonomous controller, in accordance with the invention.

In still another preferred embodiment of the invention shown in FIG. 2C, a simple network management protocol (SNMP) trap protocol data unit (PDU) alert message is sent from the autonomous controller AC(0) in FIG. 2C to a network monitor in the IP network 100, to provide notice that the cable path of a protected state controller has failed. This information can be used to alert a system administrator to arrange for a repair operation for the failed hybrid fiber/coaxial cable. As is shown in FIG. 2C, the SNMP trap PDU alert buffer 252A outputs to the network monitor the information that the HFC(0) link is in the active state and that the HFC(x) link is in the protected state, in response to the autonomous controller AC(0) going into the active state. Similarly, the SNMP trap PDU alert buffer 252B will send an alert to a network monitor that the HFC(0) link has reverted to standby in response to the controller AC(0) reverting to the standby state. The operation of the SNMP trap PDU alert is described in greater detail in the book by Marshall T. Rose, "The Simple Book: An Introduction to Network Management," published by Prentice-Hall, 1996.

Figures 5, 6:
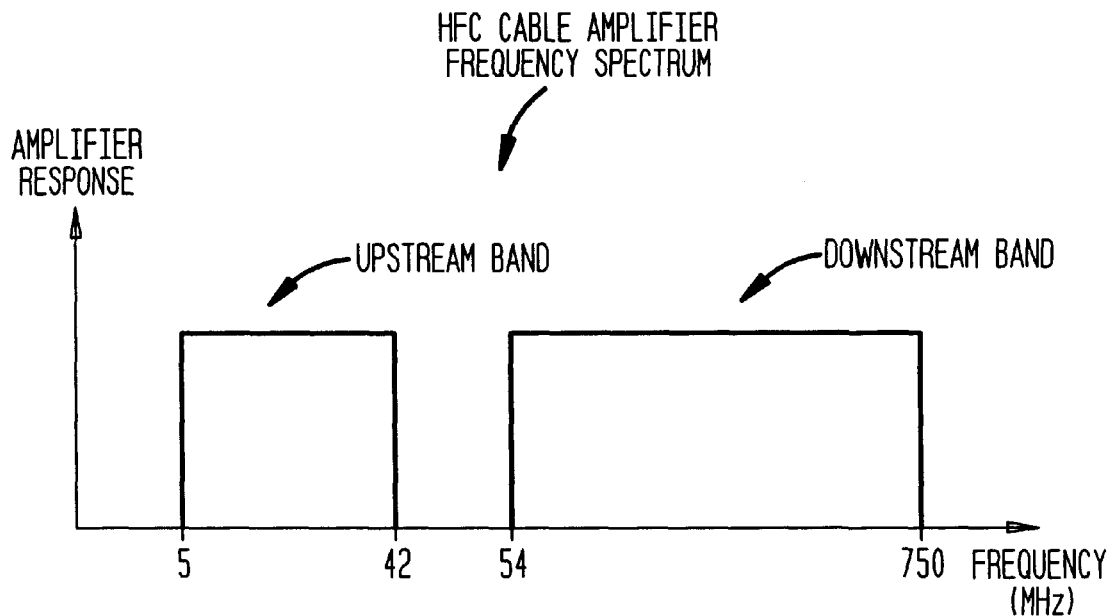
FIG. 5 illustrates the antenna frequencies for an autonomous controller.
FIG. 6 illustrates the cable amplifier frequency spectrum.

FIG. 5 illustrates the antenna frequencies for an autonomous controller, as has been described above. FIG. 6 illustrates the hybrid fiber/coaxial cable amplifier frequency spectrum showing where the downstream video, FM audio channels, IP telephony packets and IP data packets occupy sub-bands within the 54 to 750 MHz frequency band, indicated as a downstream band. The IP data packets, IP telephony, and any other information passing back up from the cable data modems to the headend occupy the upstream band in FIG. 6, which is from 5 to 42 MHZ. These frequencies are merely illustrative and other amplifier frequency pass bands can be used.

Figure 8:
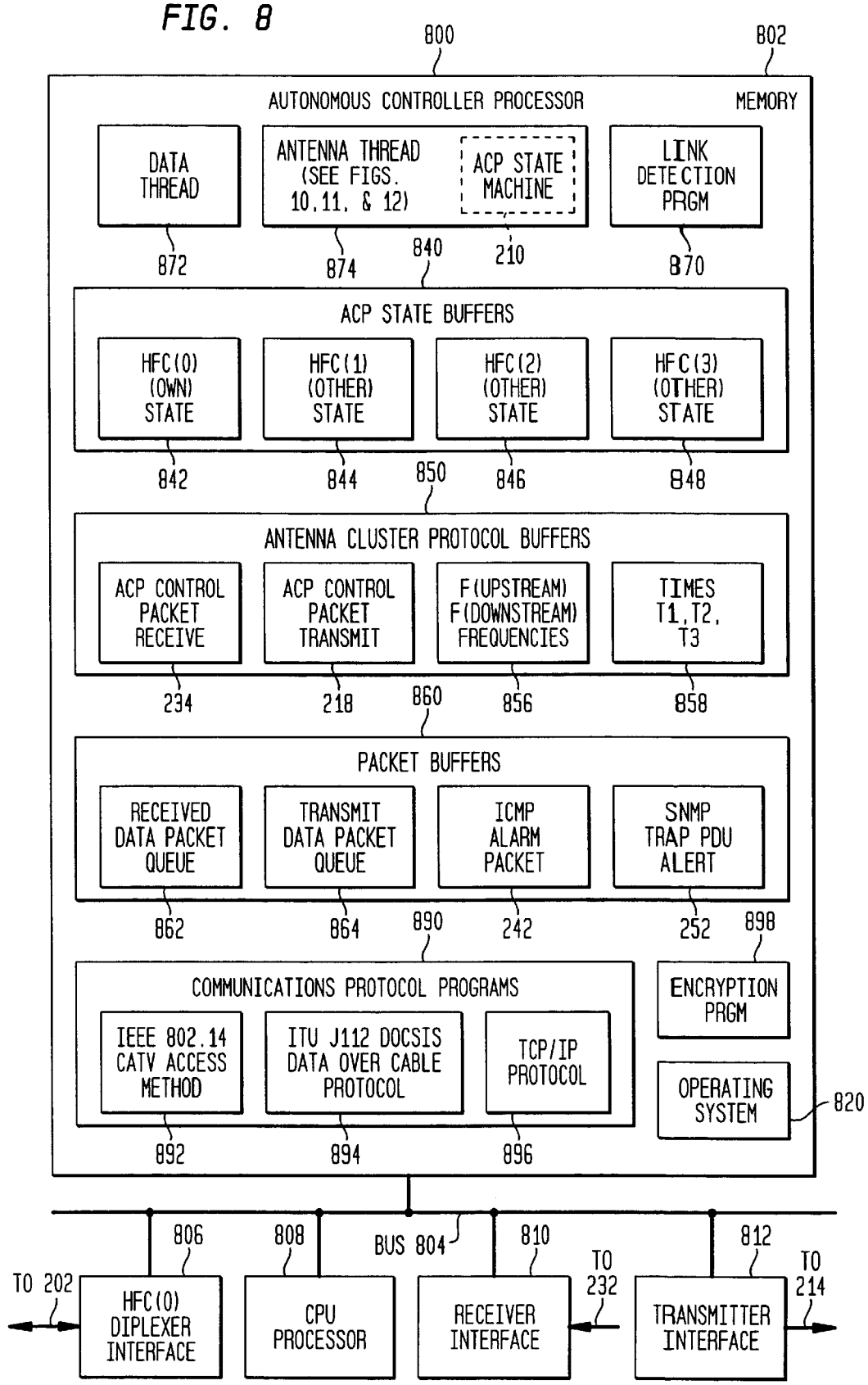
FIG. 8 is a block diagram of the autonomous controller processor.
Figure 9:
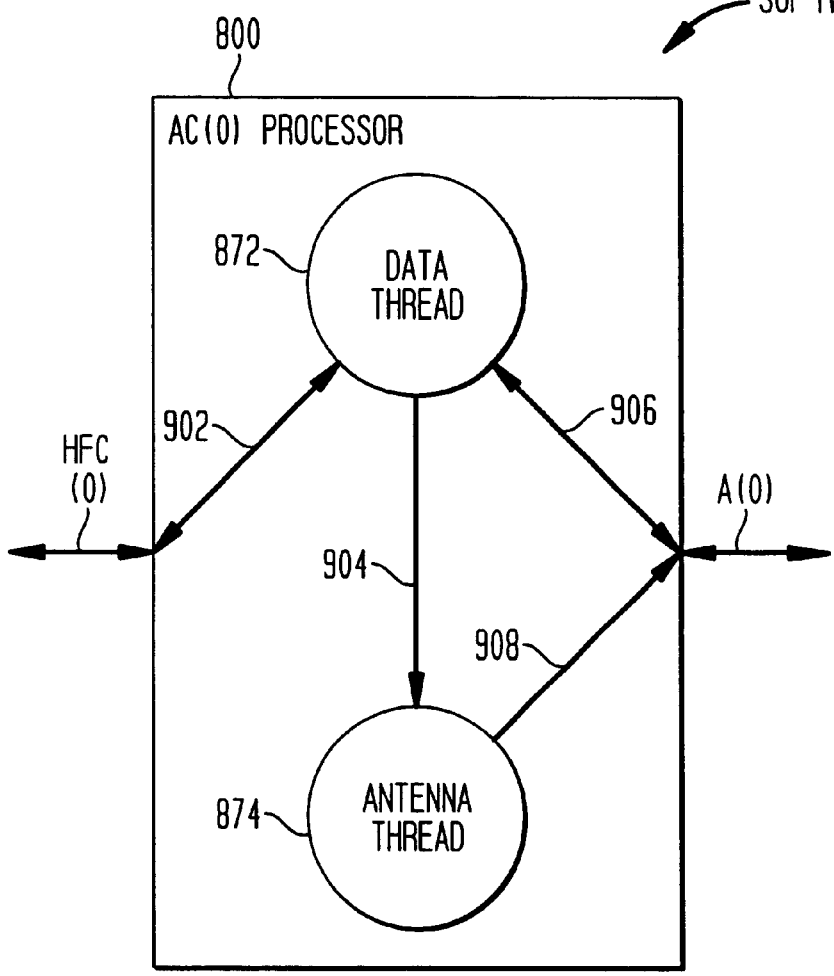
FIG. 9 is a dataflow diagram of the autonomous controller processor software architecture.

FIG. 8 illustrates the processor 800 for the autonomous controller AC(0). The processor 800 includes the memory 802 which is connected by the bus 804 to the central processing unit 808. Also connected to the bus 804 is an interface 806 to the HFC(0) diplexer 202 shown in FIG. 2A. Also connected to the bus 804 is an interface 810 to the receiver 232 and another interface 812 to the transmitter 214 in the autonomous controller shown in FIG. 2A. The memory 802 stores programs which are sequences of executable instructions which when executed by the central processing unit 808, perform the methods described in the flow diagrams of FIGS. 10, 11 and 12. Any of the programmed methods can also be embodied in code stored in a read only memory module or in an application specific integrated circuit (ASIC). The antenna thread 874 which embodies the ACP state machine functions 210, is represented for the standby state in the flow diagram of FIG. 10, for the protected state shown in the flow diagram of FIG. 11, and for the active state shown in the flow diagram of FIG. 12. A data thread 872 handles the information packet processing for information packets transmitted and received by the transmitter 214 and the receiver 232 and which are transmitted and received by the cable diplexer 202. The functional interrelationship between the data thread 872 and the antenna thread 874 is shown in the autonomous controller processor software architecture diagram of FIG. 9. There is it seen that IP data packets pass on path 902 between the cable link HFC(0) and the data thread 872. Those IP data packets are processed by the data thread 872 and are passed over the path 906 to the antenna A(0). IP data packets and ACP controller packets received on the antenna A(0) are passed over the path 906 to the data thread 872 which splits off the ACP control packets and passes them over path 904 to the antenna thread 874, while passing the received IP data packets on path 902 to the cable link HFC(0). ACP control packets which are to be transmitted by the controller AC(0) are produced by the antenna thread 874 and passed over the path 908 to the antenna A(0).

The processor 800 of FIG. 8 includes in its memory 802 the operating system program 820. Also included in memory 802 are the communications protocol programs 890, including the IEEE 802.14 CATV Access Method 892, the ITU-J112 DOCSIS data over cable protocol 894, and the TCP/IP protocol program 896. Other transport protocols can be used besides TCP, for example UDP or RTP, on top of the IP network protocol. Also included in the memory 802 is a link failure/recovery detection program 870 which operates to perform the function of the link failure/recovery detector 208 in the functional diagram of FIG. 2A and an encryption program 898 for wireless transmissions. Also included in memory 802 of FIG. 8 are the packet buffers 860 which include a receive data packet queue 862, a transmit data packet queue 864, the ICMP alarm packet buffer 242 and the SNMP trap PDU alert buffer 252. Other appropriate communications protocols include HTTP and UDP for communicating alarm information from the controllers to the headend. Also included in the memory 802 of FIG. 8 are the antenna cluster protocol buffers 850 which include the ACP control packet receive buffer 234, the ACP control packet transmit buffer 218, a buffer 856 to store the upstream and downstream frequencies, a buffer 858 to store the values for the waiting times T1, T2, T3. Also shown in the memory 802 of FIG. 8, are the ACP state buffers 840 which store the current state for HFC(0) (the controller's own state) in buffer 842, the state for HFC(1) in buffer 844, the state for HFC(2) in buffer 846 and the state for HFC(3) in buffer 848.

Figure 10:
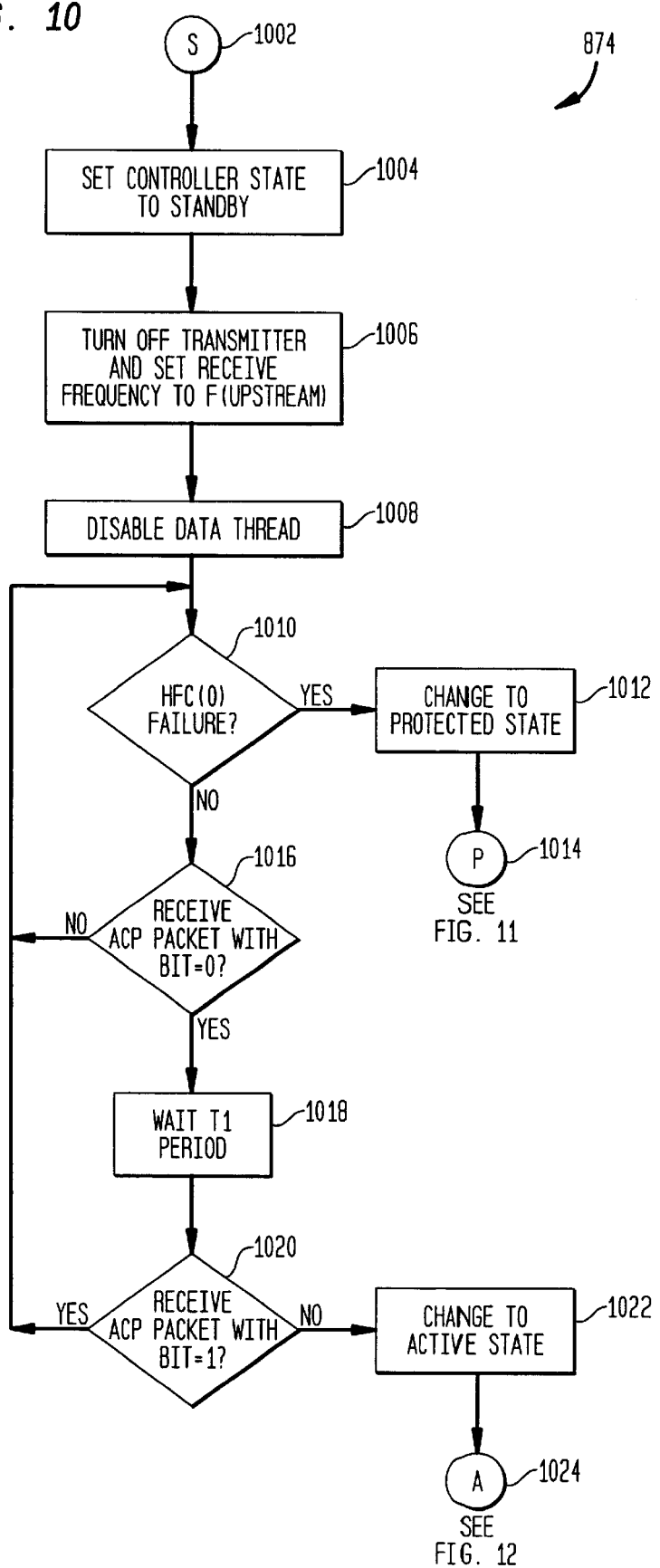
FIG. 10 is a flow diagram of the antenna thread in the standby state.

The antenna thread 874 is illustrated in FIG. 10 for the standby state. The standby state begins at entry point 1002 and transitions to step 1004 which sets the controller state to standby. In step 1006 transmitter is turned off and receiver is set to the upstream frequency. Then step 1008 disables the data thread 872. Then in step 1010, a determination is made as to whether the hybrid fiber/coaxial cable HFC(0) has failed. If it has failed then the thread transitions to step 1012 which changes to the protected state symbolized by exit point 1014 which passes to FIG. 11. Alternately, if step 1010 determines that the hybrid fiber/coaxial cable HFC(0) has not failed, then the program transitions to step 1016 which determines whether an ACP protected state packet has been received with a bit equal to 0. If it not been received, then the program loops back up to step 1010. If the protected state packet has been received from another controller, then the program proceeds to step 1018 which waits the T1 time interval before proceeding to step 1020 which determines whether the controller has received an ACP active state protected packet. If it has received such an ACP packet, then the controller will remain in the standby state and the program will loop back up to step 1010. However, if step 1020 determines that no ACP active state packet has been received by the controller, then the program transitions to step 1022 which changes the controller to the active state which is symbolized by the exit point 1024 which transitions to FIG. 12.

Figure 11:
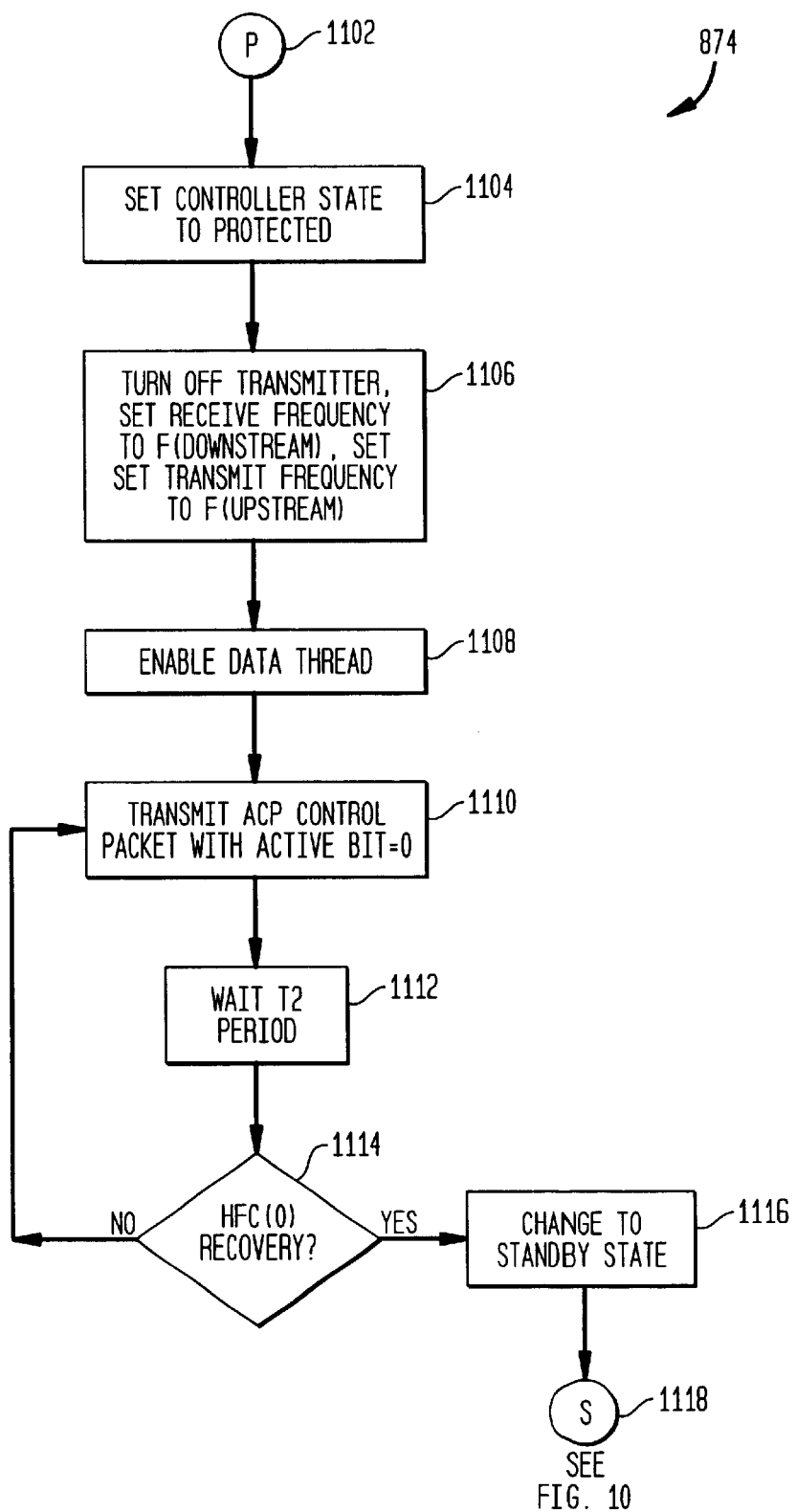
FIG. 11 is a flow diagram of the antenna thread in the protected state.

FIG. 11 illustrates the antenna thread 874 for the protected state which begins at the entry point 1102 and proceeds to step 1104 which sets the controller state to protected. Then in step 1106, the transmitter is turned on and the receiver is set to the downstream frequency and the transmitter is set to the upstream frequency. Then in step 1108, the data thread 872 is enabled. Then in step 1110, the transmitter transmits an ACP protected state controller packet with the active bit set equal to 0. Then in step 1112, the waiting interval T2 expires before the program transitions to step 114 which determines whether the hybrid fiber/coaxial cable HFC(0) has recovered as determined by the detector 208 of FIG. 2A. If it has not recovered, then the program loops back to step 1110 and the controller remains in the protected state. Alternately, if step 1114 determines that the BFC(0) hybrid fiber/coaxial cable has recovered as determined by the detector 208, then the program transitions to step 1116 which changes to the standby state as symbolized by the exit point 1118 which goes to FIG. 10.

Figure 12:
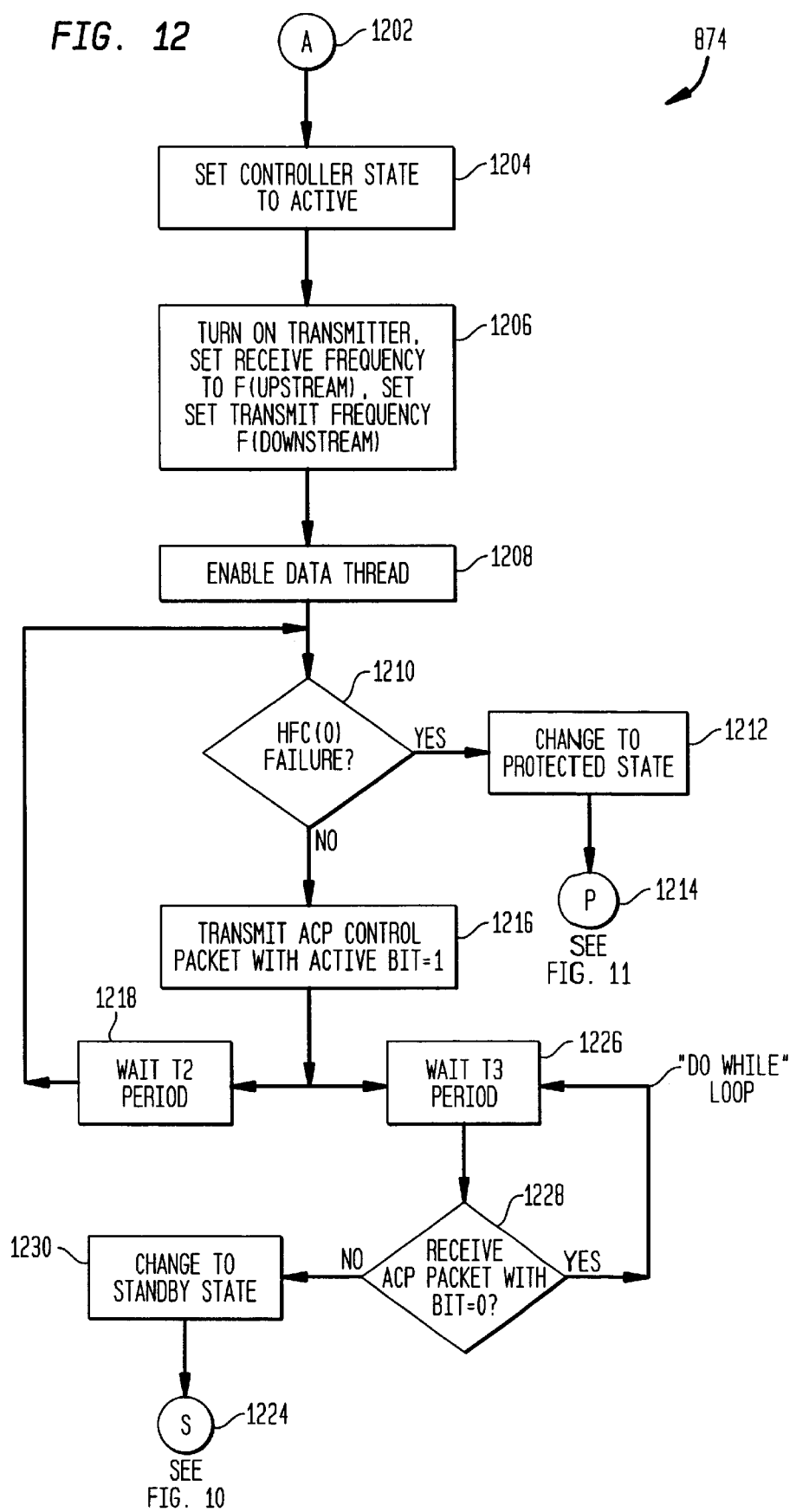
FIG. 12 is a flow diagram of the antenna thread in the active state.

FIG. 12 illustrates the antenna thread 874 in the active state, as symbolized by the entry point 1202 which transitions to step 1204 which sets controller to the active state. Then in step 1206, the transmitter is turned on, the receiver is set to the upstream frequency, and the transmitter is set to the downstream frequency. Then in step 1208, the data thread 872 is enabled. Then the program transitions to step 1210 which determines whether the hybrid fiber/coaxial cable HFC(0) has failed as determined by the detector 208 in FIG. 2A. If it has, then the program proceeds to step 1212 which changes the controller state to the protected state as is symbolized by the exit point 1214 which goes to FIG. 11. Alternately, if step 1210 determines that the hybrid fiber/coaxial cable HFC(0) has not failed, then the program transitions to step 1216 wherein the transmitter transmits the ACP active thread control packet with the active bit set equal to 1. Then the program transitions to a "do while" loop beginning at step 1226 which waits the repetition interval of T3 before going to the step 1228 which determines whether the controller has received an ACP protected state packet with a bit set equal to 0. If it has, then the controller remains in the active state by looping back up to step 1226 in the "do while" loop. Alternately, if the step 1228 determines that after having waited for the repetition period of T3 that no ACP protected state packet has been received with a bit set equal to 0, then the controller transitions to step 1218 which changes the state back to the standby state. The controller in the active state periodically transmits ACP active state control packets by means of the loop beginning with step 1216 and transitioning to step 1218 where the wait interval of T2 expires before the program passes back to step 1210. The ACP active state control packet is periodically sent every time interval of T2 until the "do while" loop of steps 1226 and 1228 determine that no more ACP protected state packets are being received from other controllers in the cluster 100.

In this manner, when a cable's connection to the headend is accidentally interrupted, service can be rapidly restored to the affected cable data modems and set top boxes attached to the cable, by means of the invention.

Various illustrative examples of the invention have been described in detail. In addition, however, many modifications and changes can be made to these examples without departing from the nature and spirit of the invention.

What is claimed is:

1. A system to provide survivability in a communications network, comprising:

a plurality of autonomous controllers selectively communicating with each other over a wireless medium, each having a wireless antenna, each having a respective state machine, each coupled to respective traffic nodes, and coupled to a respective network link which is coupled to a common distribution hub;

said state machines each having a standby state, a protected state, and an active state; said state machines each respectively assuming said standby state for its controller to prohibit communication over a wireless medium when receiving a signal from said hub via its said respective link;

one of said state machines respectively assuming said protected state for its controller when it does not receive a signal from said hub via its said respective link, and in response thereto enabling signals to and from a respective one of said traffic nodes coupled thereto to pass via its wireless antenna to and from said hub through the wireless antenna of another one of said autonomous controllers which is in said active state; and said another one of said state machines assuming said active state for its controller when it receives a protected state signal via its wireless antenna from the wireless antenna of said one of said autonomous controllers in said protected state, and in response thereto enabling traffic signals to and from said protected state controller to pass via the wireless antenna of said active state controller to and from said hub.

2. The system to provide survivability in a communications network of claim 1, further comprising:

said active state controller changing from said standby state to said active state in response to receiving said protected state signal via its wireless antenna, and broadcasting an active state signal via its wireless antenna, which is monitored by said controllers in said standby state and in said protected state.

3. The system to provide survivability in a communications network of claim 1, further comprising:

said protected state controller setting a receiver coupled to its wireless antenna at a downstream frequency and setting a transmitter coupled to its wireless antenna at an upstream frequency; and said active state controller setting a receiver coupled to its wireless antenna at said upstream frequency and setting a transmitter coupled to its wireless antenna at said downstream frequency.

4. The system to provide survivability in a communications network of claim 1, further comprising:

each of said plurality of controllers having a unique identity and priority for remaining in said active state, to prevent more than one of said controllers from remaining in said active state at the same time.

5. The system to provide survivability in a communications network of claim 1, further comprising:

each of said plurality of controllers having a unique waiting period for assuming said active state from said standby state, to prevent more than one of said controllers from assuming said active state at the same time.

6. The system to provide survivability in a communications network of claim 1, further comprising:

said protected state controller reverting to said standby state when it resumes receiving a signal from said hub via its said respective link.

7. The system to provide survivability in a communications network of claim 1, further comprising:

said active state controller reverting to said standby state when it no longer receives said protected state signals via its wireless antenna.

8. The system to provide survivability in a communications network of claim 1, further comprising:

said active state controller enabling traffic signals to and from a plurality of said protected state controllers to pass via the wireless antenna of said active state controller to and from said hub.

9. The system to provide survivability in a communications network of claim 2, further comprising:

said protected state signal being an ICMP message broadcast via the wireless antenna of said controller in said protected state; and said active state signal being an ICMP message broadcast via the wireless antenna of said controller in said active state.

10. The system to provide survivability in a communications network of claim 1, further comprising:

said signals from said traffic nodes being encrypted before being transmitted by said wireless antenna of said protected state controller; and said signals from said hub being encrypted before being transmitted by said wireless antenna of said active state controller.

11. The system to provide survivability in a communications network of claim 1, further comprising:

each of said controllers in said standby state having a wireless receiver operating to receive signals from its wireless antenna and having a wireless transmitter that is turned off to conserve power;

said protected state controllers and said active state controllers each having their respective said wireless transmitter turned on.

12. The system to provide survivability in a communications network of claim 2, further comprising:

said protected state signal and said active state signal are not sent to said distribution hub.

13. The system to provide survivability in a communications network of claim 2, further comprising:

said protected state signal is broadcast by said protected state controller at periodic intervals and said active state signal is broadcast by said active state controller at periodic intervals.

14. The system to provide survivability in a communications network of claim 13, further comprising:

each of said plurality of controllers having a second waiting period which is greater than said periodic repetition interval, for reverting from said active state to said standby state after said protected state signals are no longer received via its wireless antenna.

15. The system to provide survivability in a communications network of claim 1, further comprising:

a protected state ICMP alarm message is sent to said distribution hub to provide notice that the respective link of said protected state controller has failed.

16. The system to provide survivability in a communications network of claim 1, further comprising:

a protected state SNMP trap PDU alert message is sent to said distribution hub to provide notice that the respective link of said protected state controller has failed.

17. The system to provide survivability in a communications network of claim 1, further comprising:

said respective links being hybrid fiber/coaxial cable and said traffic nodes being cable data modems.

18. The system to provide survivability in a communications network of claim 1, further comprising:

said distribution hub being coupled to an Internet protocol network and said traffic signals being Internet protocol network signals.

19. The system to provide survivability in a communications network of claim 1, further comprising:

said distribution hub being coupled to a telephone network and said traffic signals being telephone signals.

20. The system to provide survivability in a communications network of claim 1, further comprising:

said distribution hub being coupled to a source of video and audio channels; and said respective links being coupled to set top boxes for receiving said video and audio channels.

21. A communications network topology, comprising:
a first autonomous controller selectively communicating over a wireless medium, having a wireless antenna and having a first state machine, coupled to a first network link which is coupled to a distribution hub, said first link including a first traffic node; a second autonomous controller selectively communicating over a wireless medium, having a wireless antenna and having a second state machine, coupled to a second network link which is coupled to said distribution hub, said second link including a second traffic node;
said state machines each having a standby state, a protected state, and an active state;
said state machines each respectively assuming said standby state for its controller to prohibit communication over a wireless medium when receiving a signal from said hub via its said respective link;
said first state machine assuming said protected state for said first controller when it does not receive a signal from said hub via said first link, and in response thereto enabling signals to and from said first traffic node to pass via its wireless antenna to and from said hub through the wireless antenna of said second controller which is in said active state; and
said second state machine assuming said active state for said second controller when it receives a protected state signal via its wireless antenna from the wireless antenna of said first controller in said protected state, and in response thereto enabling traffic signals to and from said first controller to pass via the wireless antenna of said second controller to and from said hub.

22. The communications network topology of claim 21, further comprising:
said second controller changing from said standby state to said active state in response to receiving said protected state signal via its wireless antenna, and broadcasting an active state signal via its wireless antenna, which is monitored by said first controller in said protected state.

23. The communications network topology of claim 21, further comprising:
said first controller setting a receiver coupled to its wireless antenna at a downstream frequency and setting a transmitter coupled to its wireless antenna at an upstream frequency; and
said second controller setting a receiver coupled to its wireless antenna at said upstream frequency and setting a transmitter coupled to its wireless antenna at said downstream frequency.

24. The communications network topology of claim 21, further comprising:
each of said controllers having a unique identity and priority for remaining in said active state, to prevent more than one of said controllers from remaining in said active state at the same time.

25. The communications network topology of claim 21, further comprising:
each of said plurality of controllers having a unique waiting period for assuming said active state from said standby state, to prevent more than one of said controllers from assuming said active state at the same time.

26. The communications network topology of claim 21, further comprising:
said first controller reverting to said standby state when it resumes receiving a signal from said hub via said first link.

27. The communications network topology of claim 21, further comprising:
said second controller reverting to said standby state when it no longer receives said protected state signals via its wireless antenna.

28. The communications network topology of claim 21, further comprising:
said second controller enabling traffic signals to and from a plurality of said first controllers in said protected state to pass via the wireless antenna of said second controller to and from said hub.

29. The communications network topology of claim 22, further comprising:
said protected state signal being an ICMP message broadcast via the wireless antenna of said first controller in said protected state; and
said active state signal being an ICMP message broadcast via the wireless antenna of said second controller in said active state.

30. The communications network topology of claim 21, further comprising:
said signals from said first traffic node being encrypted before being transmitted by said wireless antenna of first controller; and
said signals from said hub being encrypted before being transmitted by said wireless antenna of second controller.

31. The communications network topology of claim 21, further comprising:
each of said controllers in said standby state having a wireless receiver operating to receive signals from its wireless antenna and having a wireless transmitter that is turned off to conserve power; and
said first controllers and said second controllers each having their respective said wireless transmitter turned on.

32. The communications network topology of claim 22, further comprising:
said protected state signal and said active state signal are not sent to said distribution hub.

33. The communications network topology of claim 22, further comprising:
said protected state signal is broadcast by said first controller at periodic intervals and said active state signal is broadcast by said second controller at periodic intervals.

34. The communications network topology of claim 33, further comprising:
each of said plurality of controllers having a second waiting period which is greater than said periodic repetition interval, for reverting from said active state to said standby state after said protected state signals are no longer received via its wireless antenna.

35. The communications network topology of claim 21, further comprising:
a protected state ICMP alarm message is sent to said distribution hub to provide notice that said first link of said first controller has failed.

36. The communications network topology of claim 21, further comprising:
a protected state SNMP trap PDU alert message is sent to said distribution hub to provide notice that said first link of said first controller has failed.

37. The communications network topology of claim 21, further comprising:

said first and second links being hybrid fiber/coaxial cable and said first traffic node being a cable data modem.

38. The communications network topology of claim 21, further comprising:

said distribution hub being coupled to an Internet protocol network and said traffic signals being Internet protocol network signals.

39. The communications network topology of claim 21, further comprising:

said distribution hub being coupled to a telephone network and said traffic signals being telephone signals.

40. The communications network topology of claim 21, further comprising:

said distribution hub being coupled to a source of video and audio channels; and said first and second links being coupled to set top boxes for receiving said video and audio channels.

41. A communications network method, comprising:

providing a first autonomous controller selectively communicating over a wireless medium, having a wireless antenna and having a first state machine, coupled to a first network link which is coupled to a distribution hub, said first link including a first traffic node;

providing a second autonomous controller selectively communicating over a wireless medium, having a wireless antenna and having a second state machine, coupled to a second link which is coupled to said distribution hub, said second network link including a second traffic node;

said state machines each having a standby state, a protected state, and an active state;

setting each of said state machines in said standby state for its controller to prohibit communication over a wireless medium when receiving a signal from said hub via its said respective link;

setting said first state machine in said protected state for said first controller when it does not receive a signal from said hub via said first link, and in response thereto enabling signals to and from said first traffic node to pass via its wireless antenna to and from said hub through the wireless antenna of said second controller which is in said active state; and setting said second state machine in said active state for said second controller when it receives a protected state signal via its wireless antenna from the wireless antenna of said first controller in said protected state, and in response thereto enabling traffic signals to and from said first controller to pass via the wireless antenna of said second controller to and from said hub.

42. The communications network method of claim 41, further comprising: changing said second controller from said standby state to said active state in response to receiving said protected state signal via its wireless antenna, and broadcasting an active state signal via its wireless antenna, which is monitored by said first controller in said protected state.

43. A communications controller, comprising:

a wireless receiver and wireless transmitter coupled to a wireless antenna;

a state machine coupled to said wireless receiver and said wireless transmitter, and coupled to a first network link which is coupled to a distribution hub, said first link including a first traffic node;

said state machine having a standby state, a protected state, and an active state; said state machine assuming said standby state for the controller to prohibit communication over a wireless medium when receiving a signal from said hub via its said respective link;

said state machine assuming said protected state for the controller when it does not receive a signal from said hub via said first link, and in response thereto enabling signals to and from said first traffic node to pass via its wireless antenna to and from said hub through the wireless antenna of another controller substantially the same as said controller, said other controller being in said active state; and said state machine assuming said active state for the controller when it receives a protected state signal via its wireless antenna from the wireless antenna of said another controller when in said protected state, and in response thereto enabling traffic signals to and from said another controller in said protected state to pass via the wireless antenna to and from said hub.

44. The communications controller claim 43, further comprising:

said controller changing from said standby state to said active state in response to receiving said protected state signal via its wireless antenna, and broadcasting an active state signal via its wireless antenna, which is monitored by said another controller in said protected state.

45. The communications controller claim 43, further comprising:

said controller when in said protected state setting said receiver at a downstream frequency and setting said transmitter at an upstream frequency; and said controller when in said active state setting said receiver at said upstream frequency and setting said transmitter at said downstream frequency.

46. The communications controller of claim 43, further comprising:

said controller having a unique identity and priority for remaining in said active state, to prevent a plurality of said controllers from remaining in said active state at the same time.

47. The communications controller of claim 43, further comprising:

said controller having a unique waiting period for assuming said active state from said standby state, to prevent a plurality of said controllers from assuming said active state at the same time.

48. The communications controller of claim 43, further comprising:

said controller reverting from said protected state to said standby state when it resumes receiving a signal from said hub via said first link.

49. The communications controller of claim 43, further comprising:

said controller reverting from said active state to said standby state when it no longer receives said protected state signals via its wireless antenna.

50. The communications controller of claim 43, further comprising:

said controller when in said active state, enabling traffic signals to and from a plurality of said controllers in said protected state to pass to and from said hub via said wireless antenna.

51. The communications controller of claim 44, further comprising:

said protected state signal being an ICMP message broadcast via the wireless antenna of said controller when in said protected state; and said active state signal being an ICMP message broadcast via the wireless antenna of said controller when in said active state.

52. The communications controller of claim 43, further comprising:
said signals from said first traffic node being encrypted before being transmitted by said wireless antenna of controller.

53. The communications controller of claim 43, further comprising:
said controller in said standby state controlling said wireless receiver to receive signals from its wireless antenna and controlling said wireless transmitter to be turned off to conserve power; and
said controller in said protected state and in said active state having said wireless transmitter turned on.

54. The communications controller of claim 44, further comprising:
said protected state signal and said active state signal not being sent to said distribution hub.

55. The communications controller of claim 44, further comprising: said protected state signal being broadcast by said controller at periodic intervals and said active state signal being broadcast by said controller at periodic intervals.

56. The communications controller of claim 55, further comprising:
said controller having a second waiting period which is greater than said periodic repetition interval, for reverting from said active state to said standby state after said protected state signals are no longer received via its wireless antenna.

57. The communications controller of claim 44, further comprising:
a protected state ICMP alarm message being sent to said distribution hub to provide notice that said first link has failed.

58. The communications controller of claim 44, further comprising:
a protected state SNMP trap PDU alert message being sent to said distribution hub to provide notice that said first link has failed.

59. The communications controller of claim 44, further comprising:
said first link being hybrid fiber/coaxial cable and said first traffic node being a cable data modem.

60. The communications controller of claim 44, further comprising:
said distribution hub being coupled to an Internet protocol network and said traffic signals being Internet protocol network signals.

61. The communications controller of claim 44, further comprising:
said distribution hub being coupled to a telephone network and said traffic signals being telephone signals.

62. The communications controller of claim 44, further comprising:
said distribution hub being coupled to a source of video and audio channels; and
said first link being coupled to set top boxes for receiving said video and audio channels.

63. The communications controller of claim 43, further comprising:
a routing table in said distribution hub to route said signals to and from said first traffic node via said first link when said controller is in said standby state;
said controller sending an alarm message to said routing table in said distribution hub to provide notice that a second link coupled to a protected state controller has failed;
said routing table responding to said alarm message by rerouting signals to and from a second traffic node included in said second link, to pass via said first link and said wireless antenna to and from said second link.

64. The communications controller of claim 43, further comprising:
a routing table in said distribution hub to route said signals to and from said first traffic node via said first link when said when said controller is in said standby state;
said controller sending an SNMP trap PDU alert to said routing table in said distribution hub to provide notice that a second link coupled to a protected state controller has failed;
said routing table responding to said alert by rerouting signals to and from a second traffic node included in said second link to pass via said first link and said wireless antenna to and from said second link.

65. A communications control method, comprising:
establishing a standby state for a communications controller to prohibit communication over a wireless medium while hub signals are being received over a communications link from a distribution hub;
changing said controller from said standby state to a protected state if said hub signals are not received, and in response thereto transmitting a protected state signal via a wireless antenna to another controller;
receiving an active state signal from said another controller via said wireless antenna, and in response thereto, said controller in said protected state enabling traffic signals to and from a traffic node on said communications link to pass via said wireless antenna to said another controller which is in an active state;
said another controller being connected over a second communications link to said distribution hub as an alternate path for said traffic signals to pass to and from said hub.

66. The communications control method of claim 65, further comprising:
changing said controller from said protected state to said standby state if said controller resumes receiving said hub signals;
changing said controller from said standby state to said active if said protected state signals are received via said wireless antenna from said another controller, and in response thereto transmitting said active state signal via said wireless antenna to said another controller; and
exchanging second traffic signals to and from said another controller which is in said protected state to via said wireless antenna and passing said second traffic signals to and from said hub via said communications link.

67. A communications control method, comprising:
establishing a standby state for a communications controller to prohibit communication over a wireless medium while hub signals are being received over a network communications link from a router at a distribution hub;
changing said controller from said standby state to a protected state if signals are not received from said hub, and in response thereto transmitting a protected state signal via a wireless antenna to another controller;
sending an alarm message to said router from said another controller which is in an active state, giving notice that said controller in said protected state must have traffic signals to and from a traffic node on said communications link rerouted over a second communications link between said distribution hub and said another controller;

receiving an active state signal from said another controller via said wireless antenna, and in response thereto, said controller in said protected state enabling traffic signals to and from said traffic node to pass via said wireless antenna to said another controller in said active state.

68. The communications control method of claim 67, further comprising:

changing said controller from said protected state to said standby state if said controller resumes receiving said hub signals;

changing said controller from said standby state to said active state if said protected state signals are received via said wireless antenna from said another controller, and in response thereto transmitting said active state signal via said wireless antenna to said another controller;

sending a second alarm message to said router from said controller which is in an active state, giving notice that said another controller in said protected state must have traffic signals to and from a second traffic node on said second communications link rerouted over said communications link between said distribution hub and said controller; and exchanging second traffic signals to and from said another controller which is in said protected state to via said wireless antenna and passing said second traffic signals to and from said hub via said communications link.

69. A communications network, comprising: a first communications controller establishing a standby state to prohibit communication over a wireless medium while hub signals are being received over a first network communications link from a router at a distribution hub;

said first communications controller changing from said standby state to a protected state if signals are not received from said hub, and in response thereto transmitting a protected state wireless signal via a wireless antenna;

a second communications controller receiving said protected state wireless signal and in response thereto, changing from a standby state to an active state;

said second communications controller sending a control message to said router over a second network communications link between said distribution hub and said second controller, giving notice that said first controller in said protected state must have traffic signals to and from a traffic node on said first communications link rerouted over said second communications link; and said first communications controller receiving a wireless active state signal from said second controller via said wireless antenna, and in response thereto, said first controller in said protected state enabling traffic signals to and from said traffic node to pass via said wireless antenna, through said second controller and through said second communications link.

70. The communications network of claim 69, further comprising:

said second controller sending an SNMP trap PDU alert to said router in said distribution hub giving notice that said first communications link has failed.

71. The communications network of claim 69, further comprising:

said second controller sending an ICMP alarm message to said router in said distribution hub giving notice that said first communications link has failed.

72. A system to provide survivability in a communications network, comprising:

a plurality of controllers, each having a respective state machine, each coupled to respective traffic nodes, and coupled to a respective network link which is coupled to a common distribution hub;

said state machines each having a standby state, a protected state, and an active state;

said state machines each respectively assuming said standby state for its controller when receiving a signal from said hub via its said respective network link;

one of said state machines respectively assuming said protected state for its controller when it does not receive a signal from said hub via its said respective network link, and in response thereto enabling signals to and from a respective one of said traffic nodes coupled thereto to pass via its wireless antenna to and from said hub through another one of said controllers which is in said active state; and another one of said state machines assuming said active state for its controller when it receives a protected state signal via its wireless antenna from said one of said controllers in said protected state, and in response thereto enabling traffic signals to and from said protected state controller to pass via the wireless antenna of said active state controller to and from said hub.

73. A system to provide survivability in a communications network, comprising:

a plurality of controllers, each connected over a respective network link to a common distribution hub;

a state machine in each of said controllers, having a standby state, a protected state, and an active state;

said standby state existing when a first controller of the plurality is receiving a signal over its respective network link from the hub;

said first controller transitioning to the protected state when the first controller does not receive a signal over its respective network link from the hub, said first controller in the protected state sending a wireless request for connection to a second controller of the plurality, the second controller transitioning to the active state to provide over the wireless connection to the first controller, the missing signals from the hub;

said the first controller alternately transitioning from the standby state to the active state when it receives a request from another controller of the plurality to pass signals the first controller has received from the hub over its respective network link, passing those signals via a wireless connection to the other controller making the request.

* * * * *